(12) United States Patent
Schottek et al.

(10) Patent No.: US 6,949,614 B1
(45) Date of Patent: Sep. 27, 2005

(54) CATALYST SYSTEM

(75) Inventors: Jörg Schottek, Frankfurt (DE); Patricia Becker, Mörfelden-Walldorf (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 09/980,926

(22) PCT Filed: Apr. 12, 2000

(86) PCT No.: PCT/EP00/03263
§ 371 (c)(1),
(2), (4) Date: Jan. 16, 2002

(87) PCT Pub. No.: WO00/62928
PCT Pub. Date: Oct. 26, 2000

(30) Foreign Application Priority Data

Apr. 21, 1999 (DE) .......................................... 199 17 985

(51) Int. Cl.[7] .............................. C08F 4/44; C08F 4/12; B01J 31/38
(52) U.S. Cl. ....................... 526/160; 526/161; 526/943; 526/127; 526/129; 526/89; 502/104; 502/118; 502/152; 502/155
(58) Field of Search ................................ 526/160, 161, 526/943, 127, 129, 89; 502/104, 152, 155, 118

(56) References Cited

U.S. PATENT DOCUMENTS

| | | | |
|---|---|---|---|
| 5,348,299 A | 9/1994 | Clapper, Jr. | 273/138 |
| 5,384,299 A | 1/1995 | Turner et al. | 502/155 |
| 5,604,171 A | 2/1997 | Collette et al. | 502/120 |
| 5,792,819 A | 8/1998 | Erker et al. | 522/134 |
| 5,807,936 A | 9/1998 | Fritze et al. | 526/126 |
| 5,908,903 A | 6/1999 | Rösch | 526/153 |
| 6,002,032 A | 12/1999 | Erker et al. | 556/11 |
| 6,124,231 A | 9/2000 | Fritze et al. | 502/152 |
| 6,255,531 B1 | 7/2001 | Fritz et al. | 568/3 |
| 6,417,302 B1 * | 7/2002 | Bohnen | 526/160 |
| 6,482,902 B1 * | 11/2002 | Bohnen et al. | 526/127 |
| 6,537,943 B1 * | 3/2003 | Fritze et al. | 502/152 |
| 6,576,723 B1 * | 6/2003 | Bohnen et al. | 526/131 |

FOREIGN PATENT DOCUMENTS

| | | |
|---|---|---|
| CA | 2246003 | 4/1999 |
| DE | 19757540 | 6/1999 |
| DE | 19828271 | 12/1999 |
| EP | 0426637 | 5/1991 |
| EP | 474 391 | 3/1992 |
| EP | 510602 | 10/1992 |
| EP | 520 732 | 12/1992 |
| EP | 0558158 | 9/1993 |
| EP | 0619326 | 10/1994 |
| EP | 950 670 | 10/1999 |
| WO | 96/04319 | 2/1996 |
| WO | 96/23005 | 8/1996 |

OTHER PUBLICATIONS

Noth, Heinrich et al., "Alkoxyalanes and alkoxyaluminum borohydrides" *Z. Anorg. Allg. Chem.* 358:44–65, XP–002048656 (1968).

Xinmin Yang et al, "'Cation–like' Homogeneous Olefin Polymerization Catalysts Based upon Zirconocene Alkyls and Tris(pentafluorophenyl) borane" *J. Am. Chem. Soc.* 113:3623–3625 (1991).

Kazuaki Ishihara et al, "Reductive Cleavage of Chiral Acetals Using New Aluminum Catalysts," *Synlett* (2):127–127, XP–00093003 (1993).

Brintzinger, H–H et al., "Stereospezifische Olefinpolymerisation mit chiralen Metallocenkatalysatoren," *Agnew. Chem.* 107:1255–1283 (1995).

Ito Junichi, "Production of Low–Stereoregular Polypropylene" *Pat. Abs. of Japan 1995: No. 10*, Abstract of Japanese JP 07 173223 (Tokuyama Corp) (Jul. 11, 1995).

Machida Shuji, "Olefin Polymerization Catalyst and Production of Olefin Using the Same," *Pat. Abs. of Japan 1997: No. 11*, Abstract of JP 09 194521 (Idemitsu Kosan Co Ltd) (Jul. 29, 1997).

Sugimura Kenji, "Olefin Polymerization Catalyst and Process for Polymerizing Olefin" *Pat. Abs. of Japan 1998: No. 01*, Abstract of JP 09 255710 (Mitsui Petrochem Ind Ltd.) (Sep. 30, 1997).

Katayama Hiroaki, "Aluminum Compound, Catalyst for Polymerization Olefin and Production of Olefin Polymer" *Pat Abs. of Japan 1999: No. 03*, Abstract of JP 10 316695 (Sumitomo Chem Co Ltd) (Dec. 2, 1998).

\* cited by examiner

*Primary Examiner*—Robert D. Harlan
(74) *Attorney, Agent, or Firm*—Connolly Bove Lodge & Hutz LLP

(57) ABSTRACT

A catalyst system comprising a metallocene, a cocatalyst, a support material and optionally a further organometallic compound is described. The catalyst system can advantageously be used for the polymerization of olefins. Here, the use of aluminoxanes such as methylaluminoxane (MAO) as cocatalyst is dispensed with and a high catalyst activity and good polymer morphology are nevertheless achieved.

15 Claims, No Drawings

CATALYST SYSTEM

The present invention describes a catalyst system comprising a metallocene, a cocatalyst, a support material and optionally a further organometallic compound. The catalyst system can advantageously be used for the polymerization of olefins. Here, the use of aluminoxanes such as methylaluminoxane (MAO) as cocatalyst is dispensed with and a high catalyst activity and good polymer morphology are nevertheless achieved.

The role of cationic complexes in Ziegler-Natta polymerization using metallocenes is generally recognized (H. H. Brintzinger, D. Fischer, R. Mülhaupt, R. Rieger, R. Waymouth, Angew, Chem. 1995, 107, 1255–1283).

MAO has hitherto been the most effective cocatalyst but has the disadvantage of having to be used in a large excess, which leads to a high undesirable aluminum content in the polymer. The preparation of cationic alkyl complexes opens the way to MAO-free catalysts having a comparable activity, with the cocatalyst being able to be used in an almost stoichiometric amount.

The synthesis of "cation-like" metallocene polymerization catalysts is described in J. Am. Chem. Soc. 1991, 113, 3623. A process for preparing salts of the formula $LMX^+ XA^-$ according to the above-described principle is disclosed in EP-A-0 520 732.

EP-A-0 558 158 describes zwitterionic catalyst systems which are prepared from dialkyl-metallocene compounds and salts of the formula $[R_3NH]^+ [B(C_6H_5)_4]^-$. The reaction of such a salt with, for example, $Cp_2ZrMe_3$ results in protolysis with elimination of methane to form a methyl-zirconocene cation as an intermediate. This reacts via C-H-activation to give the zwitterion $Cp_2Zr^+\text{-}(m\text{-}C_6H_4)\text{-}BPh_3^-$. In this, the Zr atom is covalently bound to a carbon atom of the phenyl ring and is stabilized by agostic hydrogen bonds.

U.S. Pat. No. 5,384,299 describes zwitterionic catalyst systems prepared by protolysis from dialkyl-metallocene compounds and salts of the formula $[R_3NH]^+ [B(C_6F_5)_4]^-$. C-H Activation as subsequent reaction does not occur here.

EP-A-0 426 637 utilizes a process in which the Lewis-acid $CPh_3^+$ cation is used for abstraction of the methyl group from the metal center. $B(C_6F_5)_4^-$ likewise functions as weakly coordinating anion.

Industrial use of metallocene catalysts requires the catalyst system to be made heterogeneous so as to ensure an appropriate morphology of the resulting polymer. The application of cationic metallocene catalysts based on the above-mentioned borate anions to a support is described in WO 91/09882. Here, the catalyst system is formed by application of a dialkyl-metallocene compound and a Bronsted-acid, quaternary ammonium compound having a noncoordinating anion, e.g. tetrakispentafluorophenylborate, to an inorganic support. The support material is modified beforehand by means of a trialkylaluminum compound.

A disadvantage of this method of application to a support is that only a small part of the metallocene used is immobilized by physisorbtion on the support material. When the catalyst system is metered into the reactor, the metallocene can easily become detached from the support surface. This leads to a partly homogeneous polymerization which results in an unsatisfactory polymer morphology. WO96/04319 describes a catalyst system in which the cocatalyst is covalently bound to the support material. However, this catalyst system has a low polymerization activity and, in addition, the high sensitivity of the supported cationic metallocene catalysts can lead to problems during introduction into the polymerization system.

It would therefore be desirable to develop a catalyst system which can either be activated before introduction into the reactor or be activated only in the polymerization autoclave.

It is an object of the present invention to provide a catalyst system which avoids the disadvantages of the prior art and nevertheless guarantees high polymerization activities and a good polymer morphology. A further object is to develop a process for preparing this catalyst system which makes it possible for the catalysts system to be activated either before introduction into the polymerization autoclave or only in the polymerization autoclave itself.

We have found that these objects are achieved by a supported catalyst system and a process for preparing it. The present invention further provides for the use of the catalyst system of the present invention in the preparation of polyolefins, and also provides a corresponding polymerization process.

The catalyst system of the present invention comprises
A) at least one metallocene,
B) at least one Lewis base of the formula I

where
$R^3, R^4, R^5$ are identical or different and are each a hydrogen atom or a $C_1$–$C_{20}$-alkyl, $C_1$–$C_{20}$-haloalkyl, $C_6$–$C_{40}$-aryl, $C_6$–$C_{40}$-haloaryl, $C_7$–$C_{40}$-alkylaryl or $C_7$–$C_{40}$-arylalkyl group or two or all three of the radicals $R^3, R^4$ and $R^5$ may be joined to one another via $C_2$–$C_{20}$ units,
$M^1$ is an element of main group V of the Periodic Table of the Elements, in particular nitrogen or phosphorus
C) at least one support
D) and at least one organoboron or organoaluminum compound which is made up of units of the formula II

where
$R^6, R^7$ are identical or different and are each a hydrogen atom, a halogen atom, a boron-free $C_1$–$C_{40}$ group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl, $C_7$–$C_{40}$-haloalkylaryl or an $Si(R^9)_3$ group,
where $R^9$ is a boron-free $C_1$–$C_{40}$ group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl, $C_7$–$C_{40}$-haloalkylaryl,
$R^8$ can be identical to or different from $R^6$ and $R^7$ and is a hydrogen atom, a halogen atom, a $C_1$–$C_{40}$ group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl, $C_7$–$C_{40}$-haloalkylaryl or an $OSi(R^9)_3$ group,
X may be identical or different and are each an element of group IV, V or VIa of the Periodic Table of the Elements or an NH group.
$M^2$ is an element of group IIIa of the Periodic Table of the Elements and
k is a natural number from 1 to 100,
and is covalently bound to the support.

The compounds of the formula (II) can be in the form of monomers or in the form of linear, cyclic or cage-like oligomers. The index k is the result of Lewis acid-base interactions of the chemical compound of the formula (II) to form dimers, trimers or higher oligomers.

Particular preference is also given to compounds in which $M^2$ is aluminum or boron.

Preferred compounds of the formula (I) are triethylamine, triisoproplamine, triisobutylamine, tri(n-butyl)amine, N,N-dimethylaniline, N,N-diethylaniline, N,N-2,4,6-pentamethylaniline, dicyclohexylamine, pyridine, pyrazine, triphenylphosphine, tri(methylphenyl)phosphine, tri(dimethylphenyl)phosphine.

Preferred cocatalytically active chemical compounds of the formula (II) are compounds in which X is an oxygen atom or an NH group and the radicals $R^6$ and $R^7$ are each a boron-free $C_1$–$C_{40}$-hydrocarbon radical which may be halogenated, preferably perhalogenated, by halogen such as fluorine, chlorine, bromine or iodine, in particular a halogenated, especially perhalogenated, $C_1$–$C_{30}$-alkyl group such as trifluoromethyl, pentachloroethyl, heptafluoroisopropyl or monofluoroisobutyl or a halogenated $C_6$–$C_{30}$-aryl group such as pentafluorophenyl, 2,4,6-trifluorophenyl, heptachloronaphthyl, heptafluoronaphthyl, heptafluorotolyl, 3,5-bis(trifluoromethyl)phenyl, 2,4,6-tris(trifluoromethyl)phenyl, nonafluorobiphenyl or 4-(trifluoromethyl)phenyl. Likewise preferred as $R^6$ and $R^7$ are radicals such as phenyl, naphthyl, anisyl, methyl, ethyl, isopropyl, butyl, tolyl, biphenyl or 2,3-dimethylphenyl. Particularly preferred radicals $R^6$ and $R^7$ are pentafluorophenyl, phenyl, biphenyl, bisphenylmethylene, 3,5-bis(trifluoromethyl)phenyl, 4-(trifluoromethyl)phenyl, nonafluorobiphenyl, bis(pentafluorophenyl)methylene and 4-methylphenyl.

$R^8$ is particularly preferably a boron-free $C_1$–$C_{40}$-hydrocarbon radical which may be halogenated, preferably perhalogenated, by halogen such as fluorine, chlorine, bromine or iodine, in particular a halogenated, especially perhalogenated, $C_1$–$C_{30}$-alkyl group such as trifluoromethyl, pentachloroethyl, heptafluoroisopropyl or monofluoroisobutyl or a halogenated $C_6$–$C_{30}$-aryl group such as pentafluorophenyl, 2,4,6-trifluorophenyl, heptachloronaphthyl, heptafluoronaphthyl, heptafluorotolyl, 3,5-bis(trifluoromethyl)phenyl, 2,4,6-tris(trifluoromethyl)phenyl, nonafluorobiphenyl or 4-(trifluoromethyl)phenyl. Likewise preferred as $R^8$ are radicals such as phenyl, naphthyl, anisyl, methyl, ethyl, isopropyl, butyl, tolyl, biphenyl or 2,3-dimethylphenyl. Particularly preferred radicals $R^8$ are methyl, ethyl, isopropyl, butyl, pentafluorophenyl, phenyl, biphenyl, bisphenylmethylene, 3,5-bis(trifluoromethyl)phenyl, 4-(trifluoromethyl)phenyl, nonafluorobiphenyl, bis(pentafluorophenyl)methylene and 4-methylphenyl.

Very particularly preferred cocatalytically active chemical compounds of the formula (II) are ones in which X is oxygen, sulfur or an NH group and $M^2$ is aluminum or boron.

Nonrestrictive examples to illustrative formula II (may also be unfluorinated) are:

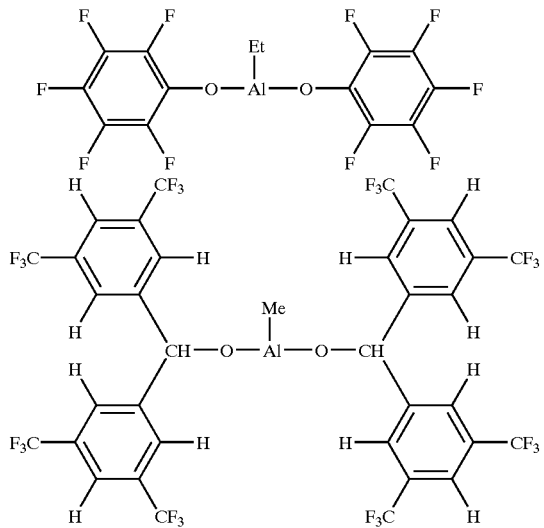

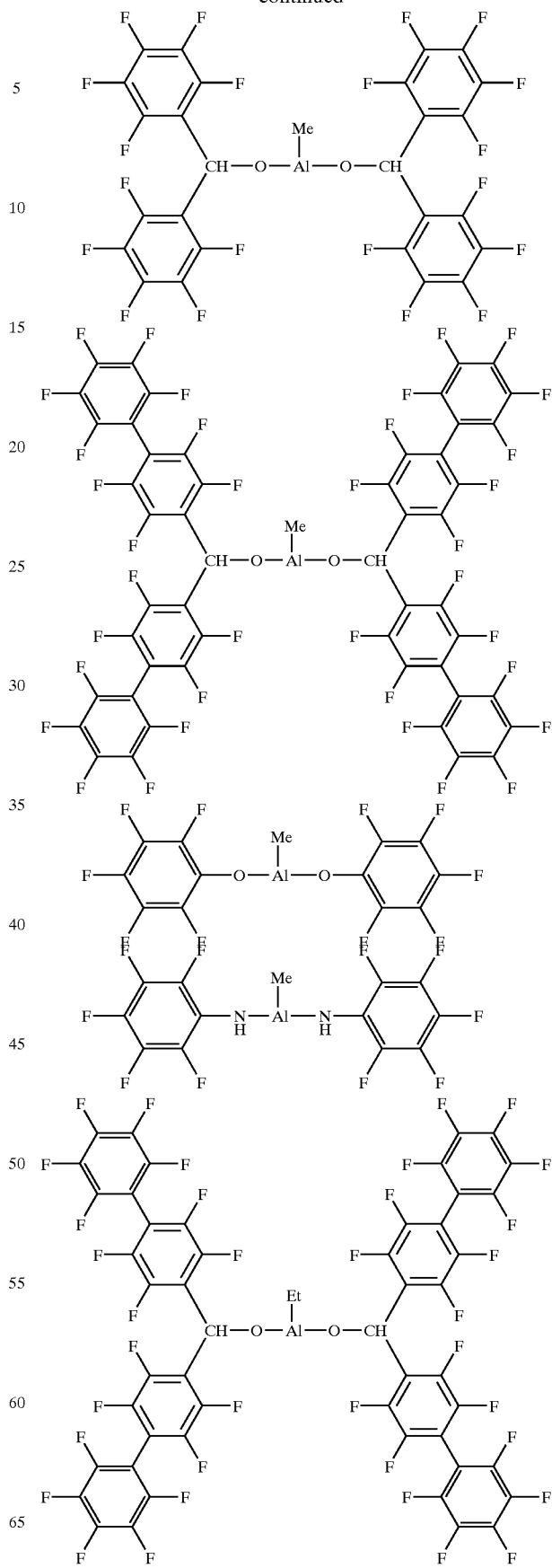

-continued

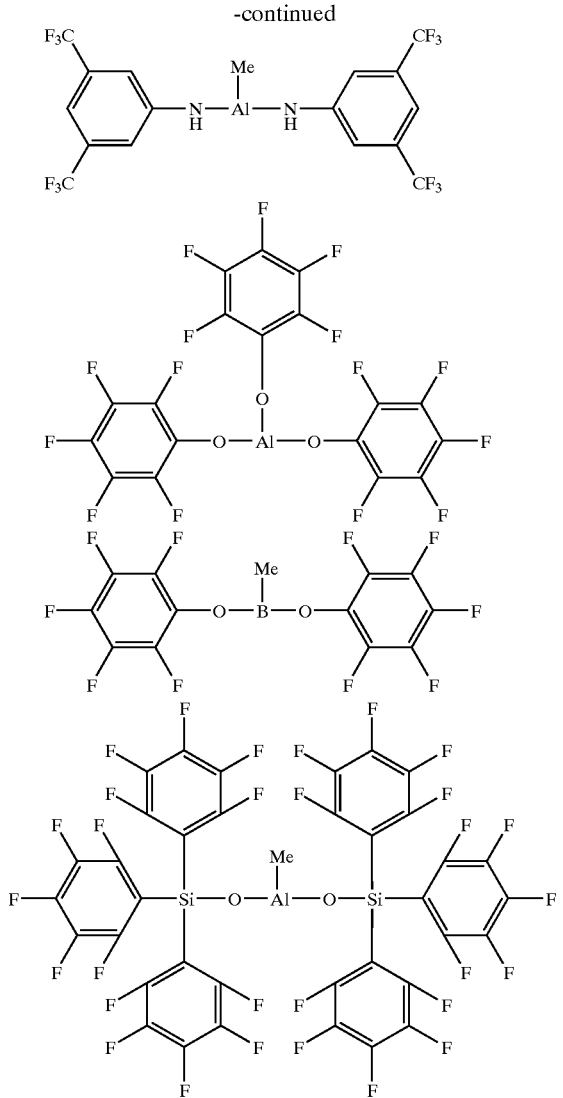

The support components of the catalyst system of the present invention can be any organic or inorganic, inert solid, in particular a porous support such as talc, inorganic oxides and finely divided polymer powders (e.g. polyolefins).

Suitable inorganic oxides are oxides of elements of groups 2, 3, 4, 5, 13, 14, 15 and 16 of the Periodix Table of the Elements. Examples of oxides preferred as supports include silicon dioxide, aluminum oxide and also mixed oxides of the two elements and corresponding oxide mixtures. Other inorganic oxides which can be used alone or in combination with the abovementioned preferred oxidic supports are, for example, MgO, $ZrO_2$, $TiO_2$ or $B_2O_3$, to name only a few.

The support materials used have a specific surface area in the range from 10 to 1000 m²/g, a pore volume in the range from 0.1 to 5 ml/g and a mean particle size of from 1 to 500 μm. Preference is given to supports having a specific surface area in the range from 50 to 500 μm, a pore volume in the range from 0.5 to 3.5 ml/g and a mean particle size in the range from 5 to 350 μm. Particular preference is given to supports having a specific surface area in the range from 200 to 400 m²/g, a pore volume in the range from 0.8 to 3.0 ml/g and a mean particle size of from 10 to 200 μm.

If the support material used naturally has a low moisture content or residual solvent content, dehydration or drying before use can be omitted. If this is not the case, for example when using silica gel as support material, dehydration or drying is advisable. Thermal dehydration or drying of the support material can be carried out under reduced pressure with simultaneous inert gas blanketing (e.g. nitrogen). The drying temperature is in the range from 100 to 1000° C., preferably from 200 to 800° C. The parameter pressure is not critical in this case. The duration of the drying process can be from 1 to 24 hours. Shorter or longer drying times are possible provided that equilibrium with the hydroxyl groups on the support surface can be established under the chosen conditions, which normally takes from 4 to 8 hours.

Dehydration or drying of the support material can also be carried out by chemical means, by reacting the adsorbed water and the hydroxyl groups on the surface with suitable passivating agents. The reaction with the passivating reagent can convert all or some of the hydroxyl groups in a form which leads to no adverse interaction with the catalytically active centers. Suitable passivating agents are, for example, silicon halides and silanes, e.g. silicon tetrachloride, chlorotrimethylsilane, dimethylaminotrichlorosilane, or organometallic compounds of aluminum, boron and magnesium, for example trimethylaluminum, triethylaluminum, triisobutylaluminum, triethylborane, dibutylmagnesium. Chemical dehydration or passivation of the support material is carried out, for example, by reacting a suspension of the support material in a suitable solvent with the passivating reagent in pure form or as a solution in a suitable solvent in the absence of air and moisture. Suitable solvents are, for example, aliphatic or aromatic hydrocarbons such as pentane, hexane, heptane, toluene or xylene. Passivation is carried out at from 25° C. to 120° C., preferably from 50° C. to 70° C. Higher and lower temperatures are possible. The reaction time is in the range from 30 minutes to 20 hours, preferably from 1 to 5 hours. After chemical dehydration is complete, the support material is isolated by filtration under inert conditions, washed one or more times with suitable inert solvents as have been described above and subsequently dried in a stream of inert gas or under reduced pressure.

Organic support materials such as finely divided polyolefin powders (e.g. polyethylene, polypropylene or polystyrene) can also be used and should likewise be freed of adhering moisture, solvent residues or other impurities by appropriate purification and drying operations before use.

The chemical compounds of the formula (I) used according to the present invention can be employed together with an organometallic transition metal compound as catalyst system. Organometallic transition metal compounds used can be, for example, metallocene compounds. These may be, for example, bridged or unbridged bisyclopentadienyl complexes as are described, for example, in EP-A-0 129 368, EP-A-0 561 479, EP-A-0 545 304 and EP-A-0 576 970, monocyclopentadienyl complexes such as bridged amidocyclopentadienyl complexes described, for example, in EP-A-0 416 815, multinuclear cyclopentadienyl complexes as described, for example, in EP-A-0 632 063, π-ligand-substituted tetrahydroentalenes as described, for example, in EP-A-0 659 758 or π-ligand-substituted tetrahydroindenes as described, for example, in EP-A-0 661 300. It is also possible to use organometallic compounds in which the complexing ligand contains no cyclopentadienyl ligand. Examples are diamine complexes of transition groups III and IV of the Periodic Table of the Elements, as are described, for example, in D. H. McConville, et al, Macromolecules, 1996, 29, 5241, and D. H. McConville, et al., J. Am. Chem. Soc., 1996, 118, 10008. It is also possible to use diimine complexes of transition group VIII of the Periodic Table of the Elements (e.g. $Ni^{2+}$ or $Pd^{2+}$ complexes), as are described in Brookhart et al., J. Am. Chem. Soc. 1995, 117, 6414, and Brookhart et al., J. Am. Chem. Soc., 1996, 118, 267. 2,6-Bis(imino)pyridyl complexes of transition group VIII of the Periodic Table of the Elements (e.g. $Co^{2+}$ or $Fe^{2+}$ complexes), as are described in Brookhart et al, J. Am. Chem. Soc. 1998, 120, 4049, and Gibson et al, Chem. Commun. 1998, 849, can also be used. Furthermore, it is possible to use metallocene compounds whose complexing ligand contains heterocycles. Examples of such compounds are described in WO 98/222486.

Preferred metallocene compounds are unbridged or bridged compounds of the formula (III),

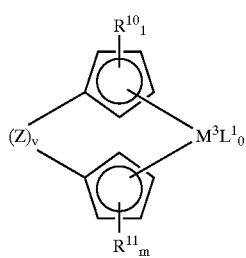

(III)

where
$M^3$ is a metal of transition group III, IV, V or VI of the Periodic Table of the Elements, in particular Ti, Zr or Hf,
$R^{10}$ are identical or different and are each a hydrogen atom or $Si(R^{12})_3$, where $R^{12}$ are identical or different and are each a hydrogen atom or a $C_1$–$C_{40}$ group, preferably $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^{10}$ is a $C_1$–$C_{30}$ group, preferably $C_1$–$C_{25}$-alkyl such as methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals $R^{10}$ may be joined to one another in such a way that the radicals $R^{10}$ and the atoms of the cyclopentadienyl ring which connect them form a $C_4$–$C_{24}$ ring system which may in turn be substituted,
$R^{11}$ are identical or different and are each a hydrogen atom or $Si(R^{12})_3$, where $R^{12}$ are identical or different and are each a hydrogen atom or a $C_1$–$C_{40}$ group, preferably $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^{11}$ is a $C_1$–$C_{30}$ group, preferably $C_1$–$C_{25}$-alkyl such as methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, $C_5$–$C_{24}$-alkylheteroaryl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals $R^{11}$ may be joined to one another in such a way that the radicals $R^{11}$ and the atoms of the cyclopentadienyl ring which connect them form a $C_4$–$C_{24}$ ring system which may in turn be substituted, is 5 when v=0, and 1 is 4 when v=1, is 5 when v=0, and m is 4 when v=1, $L^1$ may be identical or different and are each a hydrogen atom, a $C_1$–$C_{10}$-hydrocarbon group such as $C_1$–$C_{10}$-alkyl or $C_6$–$C_{10}$-aryl, a halogen atom, or $OR^{16}$, $SR^{16}$, $OSi(R^{16})_3$, $Si(R^{16})_3$, $P((R^{16})_2$ or $N(R^{16})_2$, where $R^{16}$ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or $L^1$ is a toluenesulfonyl, trifluoroacetyl, trifluoroacetoxyl, trifluoromethanesulfonyl, nonafluorobutanesulfonyl or 2,2,2-trifluoroethanesulfonyl group, o is an integer from 1 to 4, preferably 2, Z is a bridging structural element between the two cyclopentadienyl rings and v is 0 or 1.

Examples of Z are $M^4R^{13}R^{14}$ groups, where $M^4$ is carbon, silicon, germanium or tin and $R^{13}$ and $R^{14}$ are identical or different and are each a $C_1$–$C_{20}$ group such as $C_1$–$C_{10}$-alkyl, $C_6$–$C_{14}$-aryl or trimethylsilyl. Z is preferably $CH_2$, $CH_2CH_2$, $CH(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5)(CH_3)Si$, $(C_6H_5)_2Ge$, $(C_6H_5)_2Sn$, $(CH_2)_4Si$, $CH_2Si(CH_3)_2$, o-$C_6H_4$ or 2,2'-$(C_6H_4)_2$. It is also possible for Z together with one or more radicals $R^{10}$ and/or $R^{11}$ to form a monocyclic or polycyclic ring system.

Preference is given to chiral bridged metallocene compounds of the formula (III), in particular those in which v is 1 and one or both cyclopentadienyl rings are substituted so that they form an indenyl ring. The indenyl ring is preferably substituted, in particular in the 2 position, 4 position, 2,4,5 positions, 2,4,6 positions, 2,4,7 positions or 2,4,5,6 positions, by $C_1$–$C_{20}$ groups such as $C_1$–$C_{10}$-alkyl or $C_6$–$C_{20}$-aryl, where two or more substituents of the indenyl ring may also together form a ring system.

Chiral bridged metallocene compounds of the formula (III) can be used as pure racemic or pure meso compounds. However it is also possible to use mixtures of a racemic compound and a meso compound.

Examples of metallocene compounds are:
dimethylsilanediylbis(indenyl)zirconium dichloride
dimethylsilanediylbis(4-naphthyl-indenyl)zirconium dichloride
dimethylsilanediylbis(2-methyl-benzo-indenyl)zirconium dichloride
dimethylsilanediylbis(2-methyl-indenyl)zirconium dichloride
dimethylsilanediylbis(2-methyl-4-(1-naphthyl)-indenyl)zirconium dichloride
dimethylsilanediylbis(2-methyl-4-(2-naphthyl)-indenyl)zirconium dichloride
dimethylsilanediylbis(2-methyl-4-phenylindenyl)zirconium dichloride
dimethylsilanediylbis(2-methyl-4-t-butyl-indenyl)zirconium dichloride
dimethylsilanediylbis(2-methyl-4-isopropyl-indenyl)zirconium dichloride
dimethylsilanediylbis(2-methyl-4-ethyl-indenyl)zirconium dichloride
dimethylsilanediylbis(2-methyl-4-α-acenaphthindenyl)zirconium dichloride
dimethylsilanediylbis(2,4-dimethylindenyl)zirconium dichloride
dimethylsilanediylbis(2-ethyl-indenyl)zirconium dichloride
dimethylsilanediylbis(2-ethyl-4-ethylindenyl)zirconium dichloride
dimethylsilanediylbis(2-ethyl-4-phenylindenyl)zirconium dichloride
Dimethylsilandiylbis(2-methyl-4,5-benzoindenyl)zirconium dichloride
dimethylsilanediylbis(2-methyl-4,6 diisopropylindenyl)zirconium dichloride dimethylsilanediylbis(2-methyl-4,5 diisopropylindenyl) zirconium dichloride
dimethylsilanediylbis(2,4,5-trimethylindenyl)zirconium dichloride
dimethylsilanediylbis(2,5,6-trimethylindenyl)zirconium dichloride
dimethylsilanediylbis(2,4,7-trimethylindenyl)zirconium dichloride
dimethylsilanediylbis(2-methyl-5-isobutylindenyl) zirconium dichloride
dimethylsilanediylbis(2-methyl-5-t-butylindenyl)zirconium dichloride
methyl(phenyl)silanediylbis(2-methyl-4-phenylindenyl) zirconium dichloride
methyl(phenyl)silanediylbis(2-methyl-4,6-diisopropylindenyl) zirconium dichloride
methyl(phenyl)silanediylbis(2-methyl-4-isopropylindenyl) zirconium dichloride
methyl(phenyl)silanediylbis(2-methyl-4,5-benzoindenyl) zirconium dichloride
methyl(phenyl)silanediylbis(2-methyl-4,5-(methylbenzo)indenyl) zirconium dichloride
methyl(phenyl)silanediylbis(2-methyl-4,5-(tetramethylbenzo)indenyl)zirconium dichloride
methyl(phenyl)silanediylbis(2-methyl-4-α-acenaphthindenyl)zirconium dichloride
methyl(phenyl)silanediylbis(2-methylindenyl)zirconium dichloride
methyl(phenyl)silanediylbis(2-methyl-5-isobutylindenyl) zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6-diisopropylindenyl) zirconium dichloride
1,4-butanediylbis(2-methyl-4-isopropylindenyl)zirconium dichloride
1,4-butanediylbis(2-methyl-4,5-benzoindenyl)zirconium dichloride
1,2-ethanediylbis(2-methyl-4,5-benzoindenyl)zirconium dichloride
1,2-ethanediylbis(2,4,7-trimethylindenyl)zirconium dichloride
1,2-ethanediylbis(2-methyl-indenyl)zirconium dichloride
1,4-butanediylbis(2-methylindenyl)zirconium dichloride
[4-($\eta^5$-cyclopentadienyl)-4,6,6-trimethyl-($\eta^5$-4,5-tetrahydropentalene)]dichlorozirconium
[4-($\eta^5$-3'-trimethylsilylcyclopentadienyl)-4,6,6-trimethyl-($\eta^5$-4,5-tetrahydropentalene)]dichlorozirconium
[4-($\eta^5$-3'-isopropylcyclopentadienyl)-4,6,6-trimethyl-($\eta^5$-4,5-tetrahydropentalene)]dichlorozirconium
[4-($\eta^5$-cyclopentadienyl)-4,7,7-trimethyl-($\eta^5$-4,5,6,7-tetrahydroindenyl)]dichlorotitanium
[4-($\eta^5$-cyclopentadienyl)-4,7,7-trimethyl-($\eta^5$-4,5,6,7-tetrahydroindenyl)]dichlorozirconium
[4-($\eta^5$-cyclopentadienyl)-4,7,7-trimethyl-($\eta^5$-4,5,6,7-tetrahydroindenyl)]dichlorohafnium
[4-($\eta^5$-3'-tert-butylcyclopentadienyl)-4,7,7-trimethyl-($\eta^5$-4,5,6,7-tetrahydroindenyl)]dichlorotitanium
4-($\eta^5$-3'-isopropylcyclopentadienyl)-4,7,7-trimethyl-($\eta^5$-4,5,6,7-tetrahydroindenyl)]dichlorotitanium
4-($\eta^5$-3'-methylcyclopentadienyl)-4,7,7-trimethyl-($\eta^5$-4,5,6,7-tetrahydroindenyl)]dichlorotitanium
4-($\eta^5$-3'-trimethylsilylcyclopentadienyl)-2-trimethylsilyl-4,7,7-trimethyl-($\eta^5$-4,5,6,7-tetrahydroindenyl)] dichlorotitanium
4-($\eta^5$-3'-(tert-butylcyclopentadienyl)-4,7,7-trimethyl-($\eta^5$-4,5,7,7-tetrahydroindenyl)]dichlorozirconium
(tertbutylamido)(tetramethyl-$\eta^5$-cyclopentadienyl) dimethylsilyldichlorotitanium
(tertbutylamido)(tetramethyl-$\eta^5$-cyclopentadienyl)-1,2-ethanediyldichlorotitanium-dichlorotitanium
(methylamido)(tetramethyl-$\eta^5$-cyclopentadienyl) dimethylsilyldichlorotitanium
(methylamido)(tetramethyl-$\eta^5$-cyclopentadienyl)-1,2-ethanediyldichorotitanium
(tert-butylamido)(2,4-dimethyl-2,4-pentadien-1-yl) dimethylsilyldichlorotitanium
bis(cyclopentadienyl)zirconium dichloride
bis(n-butylcyclopentadienyl)zirconium dichloride
bis(1,3-dimethylcyclopentadienyl)zirconium dichloride
tetrachloro[1-[bis($\eta^5$-1H-inden-1-ylidene)methylsilyl]-3-$\eta^5$-cyclopenta-2,4-dien-1-ylidene)-3-$\eta^5$-9H-fluoren-9-ylidene)butane]dizirconium
tetrachloro[2-[bis($\eta^5$-2-methyl-1H-inden-1-ylidene) methoxysilyl]-5-($\eta^5$-2,3,4,5-tetramethylcyclopenta-2,4-dien-1-ylidene)-5-($\eta^5$-9H-fluoren-9-ylidene)hexane] dizirconium
tetrachloro[1-[bis($\eta^5$-1H-inden-1-ylidene)methylsilyl]-6-($\eta^5$-cyclopenta-2,4-dien-1-ylidene)-6-($\eta^5$-9H-fluoren-9-ylidene)-3-oxa-heptane]dizirconium
dimethylsilanediylbis(2-methyl-4-(tert-butylphenylidenyl) zirconium dichloride
dimethylsilanediylbis(2-methyl-4-(4-methylphenylindenyl) zirconium dichloride
dimethylsilanediylbis(2-methyl-4-(4-ethylphenylindenyl) zirconium dichloride
dimethylsilanediylbis(2-methyl-4-(4-trifluoromethylphenylindenyl)zirconium dichloride
dimethylsilanediylbis(2-methyl-4-(4-methoxyphenylindenyl)zirconium dichloride
dimethylsilanediylbis(2-ethyl-4-(4-tert-butylphenylindenyl) zirconium dichloride
dimethylsilanediylbis(2-ethyl-4-(4-methylphenylindenyl) zirconium dichloride
dimethylsilanediylbis(2-ethyl-4-(4-ethylphenylindenyl) zirconium dichloride
dimethylsilanediylbis(2-ethyl-4-(4-trifluoromethylphenylindenyl) zirconium dichloride
dimethylsilanediylbis(2-ethyl-4-(4-methoxyphenylindenyl) zirconium dichloride
dimethylsilanediylbis(2-methyl-4-(4-tert-butylphenylindenyl)zirconium dimethyl
dimethylsilanediylbis(2-methyl-4-(4-methylphenylindenyl) zirconium dimethyl
dimethylsilanediylbis(2-methyl-4-(4-ethylphenylindenyl) zirconium dimethyl
dimethylsilanediylbis(2-methyl-4-(4-trifluoromethylphenylindenyl)zirconium dimethyl
dimethylsilanediylbis(2-methyl-4-(4-methoxyphenylindenyl)zirconium dimethyl
dimethylsilanediylbis(2-ethyl-4-(4-tert-butylphenylindenyl) zirconium dimethyl
dimethylsilanediylbis(2-ethyl-4-(4-methylphenylindenyl) zirconium dimethyl
dimethylsilanediylbis(2-ethyl-4-(4-ethylphenylindenyl) zirconium diethyl
dimethylsilanediylbis(2-ethyl-4-(4-trifluoromethylphenylindenyl)zirconium dimethyl
dimethylsilanediylbis(2-ethyl-4-(4-methoxyphenylindenyl) zirconium dimethyl
dimethylsilanediylbis(2-methyl-4-(4'-tert-butylphenyl) indenyl) zirconium dichloride dimethylsilanediylbis(2-methyl-4-(4'-tert-butylphenyl)indenyl) hafnium dichloride
dimethylsilanediylbis(2-methyl-4-(4'-tert-butylphenyl)indenyl)titanium dichloride
dimethylsilanediylbis(2-methyl-4-(4'-methylphenyl)indenyl)zirconium dichloride
dimethylsilanediylbis(2-methyl-4-(4'-n-propylphenyl)indenyl) zirconium dichloride
dimethylsilanediylbis(2-methyl-4-(4'-n-butylphenyl)indenyl)zirconium dichloride
dimethylsilanediylbis(2-methyl-4-(4'-hexylphenyl)indenyl)zirconium dichloride
dimethylsilanediylbis(2-methyl-4-(4'-sec-butylphenyl)indenyl)zirconium dichloride
dimethylsilanediylbis(2-ethyl-4-phenyl)indenyl)zirconium dichloride
dimethylsilanediylbis(2-ethyl-4-(4'-methylphenyl)indenyl)zirconium dichloride
dimethylsilanediylbis(2-ethyl-4-(4'-ethylphenyl)indenyl)zirconium dichloride
dimethylsilanediylbis(2-ethyl-4-(4'-n-propylphenyl)indenyl)zirconium dichloride
dimethylsilanediylbis(2-ethyl-4-(4'-n-butylphenyl)indenyl)zirconium dichloride
dimethylsilanediylbis(2-ethyl-4-(4'-hexylphenyl)indenyl)zirconium dichloride
dimethylsilanediylbis(2-ethyl-4-(4'-pentylphenyl)indentyl)zirconium dichloride
dimethylsilanediylbis(2-ethyl-4-(4'-cyclohexylphenyl)indenyl)zirconium dichloride
dimethylsilanediylbis(2-ethyl-4-(4'-sec-butylphenyl)indentyl)zirconium dichloride
dimethylsilanediylbis(2-ethyl-4-(4'-tert-butylphenyl)indenyl)zirconium dichloride
dimethylsilanediylbis(2-n-propyl-4-phenyl)indenyl)zirconium dichloride
dimethylsilanediylbis(2-n-propyl-4-(4'-methylphenyl)indenyl)zirconium dichloride
dimethylsilanediylbis(2-n-propyl-4-(4'-ethylphenyl)-indenyl)zirconium dichloride
dimethylsilanediylbis(2-n-propyl-4-(4'-isopropylphenyl)indenyl)zirconium dichloride
dimethylsilanediylbis(2-n-propyl-4-(4'-n-butylphenyl)indenyl)zirconium dichloride
dimethylsilanediylbis(2-n-propyl-4-(4'-hexylphenyl)indenyl)zirconium dichloride
dimethylsilanediylbis(2-n-propyl-4-(4'-cyclohexylphenyl)indenyl)zirconium dichloride
dimethylsilanediylbis(2-n-propyl-4-(4'-sec-butylphenyl)indenyl)zirconium dichloride
dimethylsilanediylbis(2-n-propyl-4-(4'-tert-butylphenyl)indenyl)zirconium dichloride
dimethylsilanediylbis(2-n-butyl-4-phenyl)indenyl)zirconium dichloride
dimethylsilanediylbis(2-n-butyl-4-(4'-methylphenyl)indenyl)zirconium dichloride
dimethylsilanediylbis(2-n-butyl-4-(4'-ethylphenyl)indenyl)zirconium dichloride
dimethylsilanediylbis(2-n-butyl-4-(4'-n-propylphenyl)indenyl)zirconium dichloride
dimethylsilanediylbis(2-n-butyl-4-(4'-isopropylphenyl)indenyl)zirconium dichloride
dimethylsilanediylbis(2-n-butyl-4-(4'-n-butylphenyl)indenyl)zirconium dichloride
dimethylsilanediylbis(2-n-butyl-4-(4'-hexylphenyl)indenyl)zirconium dichloride
dimethylsilanediylbis(2-n-butyl-4-(4'-cyclohexylphenyl)indenyl)zirconium dichloride
dimethylsilanediylbis(2-n-butyl-4-(4'-sec-butylphenyl)indenyl)zirconium dichloride
dimethylsilanediylbis(2-n-butyl-4-(4'-tert-butylphenyl)indenyl)zirconium dichloride
dimethylsilanediylbis(2-hexyl-4-phenyl)indenyl)zirconium dichloride
dimethylsilanediylbis(2-hexyl-4-(4'-methylphenyl)indenyl)zirconium dichloride
dimethylsilanediylbis(2-hexyl-4-(4'-ethylphenyl)indenyl)zirconium dichloride
dimethylsilanediylbis(2-hexyl-4-(4'-n-propylphenyl)indenyl)zirconium dichloride
dimethylsilanediylbis(2-hexyl-4-(4'-isopropylphenyl)indenyl)zirconium dichloride
dimethylsilanediylbis(2-hexyl-4-(4'-n-butylphenyl)indenyl)zirconium dichloride
dimethylsilanediylbis(2-hexyl-4-(4'-hexylphenyl)indenyl)zirconium dichloride
dimethylsilanediylbis(2-hexyl-4-(4'-cyclohexylphenyl)indenyl)zirconium dichloride
dimethylsilanediylbis(2-hexyl-4-(4'-sec-butylphenyl)indenyl)zirconium dichloride
dimethylsilanediylbis(2-hexyl-4-(4'-tert-butylphenyl)indenyl)zirconium dichloride
dimethylsilanediylbis(2-methyl-4-(4'-tert-butylphenyl)indenyl)zirconium bis(dimethylamide)
dimethylsilanediylbis(2-ethyl-4-(4'-tert-butylphenyl)indenyl)zirconium dibenzyl
dimethylsilanediylbis(2-methyl-4-(4'-tert-butylphenyl)indenyl)zirconium dimethyl
dimethylgermanediylbis(2-ethyl-4-(4'-tert-butylphenyl)indenyl)zirconium dichloride
dimethylgermanediylbis(2-ethyl-4-(4'-tert-butylphenyl)indenyl)hafnium dichloride
dimethylgermanediylbis(2-propyl-4-(4'-tert-butylphenyl)indenyl)titanium dichloride
dimethylgermanediylbis(2-methyl-4-(4'-tert-butylphenyl)indenyl)zirconium dichloride
ethylidenebis(2-ethyl-4-phenyl)indenyl)zirconium dichloride
ethylidenebis(2-ethyl-4-(4'-tert-butylphenyl)indenyl)zirconium dichloride
ethylidenebis(2-n-propyl-4-(4'-tert-butylphenyl)indenyl)zirconium dichloride
ethylidenebis(2-n-butyl-4-(4'-tert-butylphenyl)indenyl)titanium dichloride
ethylidenebis(2-hexyl-4-(4'-tert-butylphenyl)indenyl)zirconium dibenzyl
ethylidenebis(2-ethyl-4-(4'-tert-butylphenyl)indenyl)hafnium dibenzyl
ethylidenebis(2-methyl-4-(4'-tert-butylphenyl)indenyl)titanium dibenzyl
ethylidenebis(2-methyl-4-(4'-tert-butylphenyl)indenyl)zirconium dichloride
ethylidenebis(2-ethyl-4-(4'-tert-butylphenyl)indenyl)hafnium dimethyl
ethylidenebis(2-n-propyl-4-phenyl)indenyl)titanium dimethyl
ethylidenebis(2-ethyl-4-(4'-tert-butylphenyl)indenyl)zirconium bis(dimethylamide)
ethylidenebis(2-ethyl-4-(4'-tert-butylphenyl)indenyl)hafnium bis(dimethylamide)
ethylidenebis(2-ethyl-4-(4'-tert-butylphenyl)indenyl)titanium bis(dimethylamide)
methylethylidenebis(2-ethyl-4-(4'-tert-butylphenyl)indenyl)zirconium dichloride
methylethylidenebis(2-ethyl-4-(4'-tert-butylphenyl)indenyl)hafnium dichloride phenylphosphinediyl(2-ethyl-4-(4'-tert-butylphenyl)indenyl)zirconium dichloride
phenylphosphinediyl(2-methyl-4-(4'-tert-butylphenyl)indenyl)zirconium dichloride
phenylphosphinediyl(2-ethyl-4-(4'-tert-butylphenyl)indenyl)zirconium dichloride
dimethylsilanediyl(2-methyl-4-azapentalene)(2-methyl-4-(4'-methylphenylindenyl)zirconium dichloride
dimethylsilanediyl(2-methyl-5-azapentalene)(2-methyl-4-(4'-methylphenylindenyl)zirconium dichloride
dimethylsilanediyl(2-methyl-6-azapentalene)(2-methyl-4-(4'-methylphenylindenyl)zirconium dichloride
dimethylsilanediyl(2-methyl-N-phenyl-4-azapentalene)(2-methyl-4-(4'-methylphenylindenyl)zirconium dichloride
dimethylsilanediyl(2-methyl-N-phenyl-5-azapentalene)(2-methyl-4-(4'-methylphenylindenyl)zirconium dichloride
dimethylsilanediyl(2-methyl-N-phenyl-6-azapentalene)(2-methyl-4-(4'-methylphenylindenyl)zirconium dichloride
dimethylsilanediyl(2,5-dimethyl-4-azapentalene)(2-methyl-4-(4'-methylphenylindenyl)zirconium dichloride
dimethylsilanediyl(2,5-dimethyl-6-azapentalene)(2-methyl-4-(4'-methylphenylindenyl)zirconium dichloride
dimethylsilanediyl(2,5-dimethyl-N-phenyl-4-azapentalene)(2-methyl-4-(4'-methylphenylindenyl)zirconium dichloride
dimethylsilanediyl(2,5-dimethyl-N-phenyl-6-azapentalene)(2-methyl-4-(4'-methylphenylindenyl)zirconium dichloride
dimethylsilanediyl(2-methyl-4-thiapentalene)(2-methyl-4-(4'-methylphenylindenyl)zirconium dichloride
dimethylsilanediyl(2-methyl-5-thiapentalene)(2-methyl-4-(4'-methylphenylindenyl)zirconium dichloride
dimethylsilanediyl(2-methyl-6-thiapentalene)(2-methyl-4-(4'-methylphenylindenyl)zirconium dichloride
dimethylsilanediyl(2,5-dimethyl-4-thiapentalene)(2-methyl-4-(4'-methylphenylindenyl)zirconium dichloride
dimethylsilanediyl(2,5-dimethyl-6-thiapentalene)(2-methyl-4-(4'-methylphenylindenyl)zirconium dichloride
dimethylsilanediyl(2-methyl-4-oxapentalene)(2-methyl-4-(4'-methylphenylindenyl)zirconium dichloride
dimethylsilanediyl(2-methyl-5-oxapentalene)(2-methyl-4-(4'-methylphenylindenyl)zirconium dichloride
dimethylsilanediyl(2-methyl-6-oxapentalene)(2-methyl-4-(4'-methylphenylindenyl)zirconium dichloride
dimethylsilanediyl(2,5-dimethyl-4-oxapentalene)(2-methyl-4-(4'-methylphenylindenyl)zirconium dichloride
dimethylsilanediyl(2,5-dimethyl-6-oxapentalene)(2-methyl-4-(4'-methylphenylindenyl)zirconium dichloride
dimethylsilanediyl(2-methyl-4-azapentalene)(2-methyl-4-(4'-ethylphenylindenyl)zirconium dichloride
dimethylsilanediyl(2-methyl-5-azapentalene)(2-methyl-4-(4'-ethylphenylindenyl)zirconium dichloride
dimethylsilanediyl(2-methyl-6-azapentalene)(2-methyl-4-(4'-ethylphenylindenyl)zirconium dichloride
dimethylsilanediyl(2-methyl-N-phenyl-4-azapentalene)(2-methyl-4-(4'-ethylphenylindenyl)zirconium dichloride
dimethylsilanediyl(2-methyl-N-phenyl-5-azapentalene)(2-methyl-4-(4'-ethylphenylindenyl)zirconium dichloride
dimethylsilanediyl(2-methyl-N-phenyl-6-azapentalene)(2-methyl-4-(4'-ethylphenylindenyl)zirconium dichloride
dimethylsilanediyl(2,5-dimethyl-4-azapentalene)(2-methyl-4-(4'-ethylphenylindenyl)zirconium dichloride
dimethylsilanediyl(2,5-dimethyl-6-azapentalene)(2-methyl-4-(4'-ethylphenylindenyl)zirconium dichloride
dimethylsilanediyl(2,5-dimethyl-N-phenyl-4-azapentalene)(2-methyl-4-(4'-ethylphenylindenyl)zirconium dichloride
dimethylsilanediyl(2,5-dimethyl-N-phenyl-6-azapentalene)(2-methyl-4-(4'-ethylphenylindenyl)zirconium dichloride
dimethylsilanediyl(2-methyl-4-thiapentalene)(2-methyl-4-(4'-ethylphenylindenyl)zirconium dichloride
dimethylsilanediyl(2-methyl-5-thiapentalene)(2-methyl-4-(4'-ethylphenylindenyl)zirconium dichloride
dimethylsilanediyl(2-methyl-6-thiapentalene)(2-methyl-4-(4'-ethylphenylindenyl)zirconium dichloride
dimethylsilanediyl(2,5-dimethyl-4-thiapentalene)(2-methyl-4-(4'-ethylphenylindenyl)zirconium dichloride
dimethylsilanediyl(2,5-dimethyl-6-thiapentalene)(2-methyl-4-(4'-ethylphenylindenyl)zirconium dichloride
dimethylsilanediyl(2-methyl-4-oxapentalene)(2-methyl-4-(4'-ethylphenylindenyl)zirconium dichloride
dimethylsilanediyl(2-methyl-5-oxapentalene)(2-methyl-4-(4'-ethylphenylindenyl)zirconium dichloride
dimethylsilanediyl(2-methyl-6-oxapentalene)(2-methyl-4-(4'-ethylphenylindenyl)zirconium dichloride
dimethylsilanediyl(2,5-dimethyl-4-oxapentalene)(2-methyl-4-(4'-ethylphenylindenyl)zirconium dichloride
dimethylsilanediyl(2,5-dimethyl-6-oxapentalene)(2-methyl-4-(4'-ethylphenylindenyl)zirconium dichloride
dimethylsilanediyl(2-methyl-4-azapentalene)(2-methyl-4-(4'-n-propylphenylindenyl)zirconium dichloride
dimethylsilanediyl(2-methyl-5-azapentalene)(2-methyl-4-(4'-n-propylphenylindenyl)zirconium dichloride
dimethylsilanediyl(2-methyl-6-azapentalene)(2-methyl-4-(4'-n-propylphenylindenyl)zirconium dichloride
dimethylsilanediyl(2-methyl-N-phenyl-4-azapentalene)(2-methyl-4-(4'-n-propylphenylindenyl)zirconium dichloride
dimethylsilanediyl(2-methyl-N-phenyl-5-azapentalene)(2-methyl-4-(4'-n-propylphenylindenyl)zirconium dichloride
dimethylsilanediyl(2-methyl-N-phenyl-6-azapentalene)(2-methyl-4-(4'-n-propylphenylindenyl)zirconium dichloride
dimethylsilanediyl(2,5-dimethyl-4-azapentalene)(2-methyl-4-(4'-n-propylphenylindenyl)zirconium dichloride
dimethylsilanediyl(2,5-dimethyl-6-azapentalene)(2-methyl-4-(4'-n-propylphenylindenyl)zirconium dichloride
dimethylsilanediyl(2,5-dimethyl-N-phenyl-4-azapentalene)(2-methyl-4-(4'-n-propylphenylindenyl)zirconium dichloride
dimethylsilanediyl(2,5-dimethyl-N-phenyl-6-azapentalene)(2-methyl-4-(4'-n-propylphenylindenyl)zirconium dichloride
dimethylsilanediyl(2-methyl-4-thiapentalene)(2-methyl-4-(4'-n-propylphenylindenyl)zirconium dichloride
dimethylsilanediyl(2-methyl-5-thiapentalene)(2-methyl-4-(4'-n-propylphenylindenyl)zirconium dichloride
dimethylsilanediyl(2-methyl-6-thiapentalene)(2-methyl-4-(4'-n-propylphenylindenyl)zirconium dichloride
dimethylsilanediyl(2,5-dimethyl-4-thiapentalene)(2-methyl-4-(4'-n-propylphenylindenyl)zirconium dichloride
dimethylsilanediyl(2,5-dimethyl-6-thiapentalene)(2-methyl-4-(4'-n-propylphenylindenyl)zirconium dichloride
dimethylsilanediyl(2-methyl-4-oxapentalene)(2-methyl-4-(4'-n-propylphenylindenyl)zirconium dichloride
dimethylsilanediyl(2-methyl-5-oxapentalene)(2-methyl-4-(4'-n-propylphenylindenyl)zirconium dichloride
dimethylsilanediyl(2-methyl-6-oxapentalene)(2-methyl-4-(4'-n-propylphenylindenyl)zirconium dichloride
dimethylsilanediyl(2,5-dimethyl-4-oxapentalene)(2-methyl-4-(4'-n-propylphenylindenyl)zirconium dichloride
dimethylsilanediyl(2,5-dimethyl-6-oxapentalene)(2-methyl-4-(4'-n-propylphenylindenyl)zirconium dichloride dimethylsilanediyl(2-methyl-4-azapentalene)(2-methyl-4-(4'-isopropylphenylindenyl)zirconium dichloride
dimethylsilanediyl(2-methyl-5-azapentalene)(2-methyl-4-(4'-isopropylphenylindenyl)zirconium dichloride
dimethylsilanediyl(2-methyl-6-azapentalene)(2-methyl-4-(4'-isopropylphenylindenyl)zirconium dichloride
dimethylsilanediyl(2-methyl-N-phenyl-4-azapentalene)(2-methyl-4-(4'-isopropylphenylindenyl)zirconium dichloride
dimethylsilanediyl(2-methyl-N-phenyl-5-azapentalene)(2-methyl-4-(4'-isopropylphenylindenyl)zirconium dichloride
dimethylsilanediyl(2-methyl-N-phenyl-6-azapentalene)(2-methyl-4-(4'-isopropylphenylindenyl)zirconium dichloride
dimethylsilanediyl(2,5-dimethyl-4-azapentalene)(2-methyl-4-(4'-isopropylphenylindenyl)zirconium dichloride
dimethylsilanediyl(2,5-dimethyl-6-azapentalene)(2-methyl-4-(4'-isopropylphenylindenyl)zirconium dichloride
dimethylsilanediyl(2,5-dimethyl-N-phenyl-4-azapentalene)(2-methyl-4-(4'-isopropylphenylindenyl)zirconium dichloride
dimethylsilanediyl(2,5-dimethyl-N-phenyl-6-azapentalene)(2-methyl-4-(4'-isopropylphenylindenyl)zirconium dichloride
dimethylsilanediyl(2-methyl-4-thiapentalene)(2-methyl-4-(4'-isopropylphenylindenyl)zirconium dichloride
dimethylsilanediyl(2-methyl-5-thiapentalene)(2-methyl-4-(4'-isopropylphenylindenyl)zirconium dichloride
dimethylsilanediyl(2-methyl-6-thiapentalene)(2-methyl-4-(4'-isopropylphenylindenyl)zirconium dichloride
dimethylsilanediyl(2,5-dimethyl-4-thiapentalene)(2-methyl-4-(4'-isopropylphenylindenyl)zirconium dichloride
dimethylsilanediyl(2,5-dimethyl-6-thiapentalene)(2-methyl-4-(4'-isopropylphenylindenyl)zirconium dichloride
dimethylsilanediyl(2-methyl-4-oxapentalene)(2-methyl-4-(4'-isopropylphenylindenyl)zirconium dichloride
dimethylsilanediyl(2-methyl-5-oxapentalene)(2-methyl-4-(4'-isopropylphenylindenyl)zirconium dichloride
dimethylsilanediyl(2-methyl-6-oxapentalene)(2-methyl-4-(4'-isopropylphenylindenyl)zirconium dichloride
dimethylsilanediyl(2,5-dimethyl-4-oxapentalene)(2-methyl-4-(4'-isopropylphenylindenyl)zirconium dichloride
dimethylsilanediyl(2,5-dimethyl-6-oxapentalene)(2-methyl-4-(4'-isopropylphenylindenyl)zirconium dichloride
dimethylsilanediyl(2-methyl-4-azapentalene)(2-methyl-4-(4'-n-butylphenylindenyl)zirconium dichloride
dimethylsilanediyl(2-methyl-5-azapentalene)(2-methyl-4-(4'-n-butylphenylindenyl)zirconium dichloride
dimethylsilanediyl(2-methyl-6-azapentalene)(2-methyl-4-(4'-n-butylphenylindenyl)zirconium dichloride
dimethylsilanediyl(2-methyl-N-phenyl-4-azapentalene)(2-methyl-4-(4'-n-butylphenylindenyl)zirconium dichloride
dimethylsilanediyl(2-methyl-N-phenyl-5-azapentalene)(2-methyl-4-(4'-n-butylphenylindenyl)zirconium dichloride
dimethylsilanediyl(2-methyl-N-phenyl-6-azapentalene)(2-methyl-4-(4'-n-butylphenylindenyl)zirconium dichloride
dimethylsilanediyl(2,5-dimethyl-4-azapentalene)(2-methyl-4-(4'-n-butylphenylindenyl)zirconium dichloride
dimethylsilanediyl(2,5-dimethyl-6-azapentalene)(2-methyl-4-(4'-n-butylphenylindenyl)zirconium dichloride
dimethylsilanediyl(2,5-dimethyl-N-phenyl-4-azapentalene)(2-methyl-4-(4'-n-butylphenylindenyl)zirconium dichloride
dimethylsilanediyl(2,5-dimethyl-N-phenyl-6-azapentalene)(2-methyl-4-(4'-n-butylphenylindenyl)zirconium dichloride
dimethylsilanediyl(2-methyl-4-thiapentalene)(2-methyl-4-(4'-n-butylphenylindenyl)zirconium dichloride
dimethylsilanediyl(2-methyl-5-thiapentalene)(2-methyl-4-(4'-n-butylphenylindenyl)zirconium dichloride
dimethylsilanediyl(2-methyl-6-thiapentalene)(2-methyl-4-(4'-n-butylphenylindenyl)zirconium dichloride
dimethylsilanediyl(2,5-dimethyl-4-thiapentalene)(2-methyl-4-(4'-n-butylphenylindenyl)zirconium dichloride
dimethylsilanediyl(2,5-dimethyl-6-thiapentalene)(2-methyl-4-(4'-n-butylphenylindenyl)zirconium dichloride
dimethylsilanediyl(2-methyl-4-oxapentalene)(2-methyl-4-(4'-n-butylphenylindenyl)zirconium dichloride
dimethylsilanediyl(2-methyl-5-oxapentalene)(2-methyl-4-(4'-n-butylphenylindenyl)zirconium dichloride
dimethylsilanediyl(2-methyl-6-oxapentalene)(2-methyl-4-(4'-n-butylphenylindenyl)zirconium dichloride
dimethylsilanediyl(2,5-dimethyl-4-oxapentalene)(2-methyl-4-(4'-n-butylphenylindenyl)zirconium dichloride
dimethylsilanediyl(2,5-dimethyl-6-oxapentalene)(2-methyl-4-(4'-n-butylphenylindenyl)zirconium dichloride
dimethylsilanediyl(2-methyl-4-azapentalene)(2-methyl-4-(4'-s-butylphenylindenyl)zirconium dichloride
dimethylsilanediyl(2-methyl-5-azapentalene)(2-methyl-4-(4'-s-butylphenylindenyl)zirconium dichloride
dimethylsilanediyl(2-methyl-6-azapentalene)(2-methyl-4-(4'-s-butylphenylindenyl)zirconium dichloride
dimethylsilanediyl(2-methyl-N-phenyl-4-azapentalene)(2-methyl-4-(4'-s-butylphenylindenyl)zirconium dichloride
dimethylsilanediyl(2-methyl-N-phenyl-5-azapentalene)(2-methyl-4-(4'-s-butylphenylindenyl)zirconium dichloride
dimethylsilanediyl(2-methyl-N-phenyl-6-azapentalene)(2-methyl-4-(4'-s-butylphenylindenyl)zirconium dichloride
dimethylsilanediyl(2,5-dimethyl-4-azapentalene)(2-methyl-4-(4'-s-butylphenylindenyl)zirconium dichloride
dimethylsilanediyl(2,5-dimethyl-6-azapentalene)(2-methyl-4-(4'-s-butylphenylindenyl)zirconium dichloride
dimethylsilanediyl(2,5-dimethyl-N-phenyl-4-azapentalene)(2-methyl-4-(4'-s-butylphenylindenyl)zirconium dichloride
dimethylsilanediyl(2,5-dimethyl-N-phenyl-6-azapentalene)(2-methyl-4-(4'-s-butylphenylindenyl)zirconium dichloride
dimethylsilanediyl(2-methyl-4-thiapentalene)(2-methyl-4-(4'-s-butylphenylindenyl)zirconium dichloride
dimethylsilanediyl(2-methyl-5-thiapentalene)(2-methyl-4-(4'-s-butylphenylindenyl)zirconium dichloride
dimethylsilanediyl(2-methyl-6-thiapentalene)(2-methyl-4-(4'-s-butylphenylindenyl)zirconium dichloride
dimethylsilanediyl(2,5-dimethyl-4-thiapentalene)(2-methyl-4-(4'-s-butylphenylindenyl)zirconium dichloride
dimethylsilanediyl(2,5-dimethyl-6-thiapentalene)(2-methyl-4-(4'-s-butylphenylindenyl)zirconium dichloride
dimethylsilanediyl(2-methyl-4-oxapentalene)(2-methyl-4-(4'-s-butylphenylindenyl)zirconium dichloride
dimethylsilanediyl(2-methyl-5-oxapentalene)(2-methyl-4-(4'-s-butylphenylindenyl)zirconium dichloride
dimethylsilanediyl(2-methyl-6-oxapentalene)(2-methyl-4-(4'-s-butylphenylindenyl)zirconium dichloride
dimethylsilanediyl(2,5-dimethyl-4-oxapentalene)(2-methyl-4-(4'-s-butylphenylindenyl)zirconium dichloride
dimethylsilanediyl(2,5-dimethyl-6-oxapentalene)(2-methyl-4-(4'-s-butylphenylindenyl)zirconium dichloride
dimethylsilanediyl(2-methyl-4-azapentalene)(2-methyl-4-(4'-tert-butylphenylindenyl)zirconium dichloride
dimethylsilanediyl(2-methyl-5-azapentalene)(2-methyl-4-(4'-tert-butylphenylindenyl)zirconium dichloride
dimethylsilanediyl(2-methyl-6-azapentalene)(2-methyl-4-(4'-tert-butylphenylindenyl)zirconium dichloride dimethylsilanediyl(2-methyl-N-phenyl-4-azapentalene)(2-methyl-4-(4'-tert-butylphenylindenyl)zirconium dichloride
dimethylsilanediyl(2-methyl-N-phenyl-5-azapentalene)(2-methyl-4-(4'-tert-butylphenylindenyl)zirconium dichloride
dimethylsilanediyl(2-methyl-N-phenyl-6-azapentalene)(2-methyl-4-(4'-tert-butylphenylindenyl)zirconium dichloride
dimethylsilanediyl(2,5-dimethyl-4-azapentalene)(2-methyl-4-(4'-tert-butylphenylindenyl)zirconium dichloride
dimethylsilanediyl(2,5-dimethyl-6-azapentalene)(2-methyl-4-(4'-tert-butylphenylindenyl)zirconium dichloride
dimethylsilanediyl(2,5-dimethyl-N-phenyl-4-azapentalene)(2-methyl-4-(4'-tert-butylphenylindenyl)zirconium dichloride
dimethylsilanediyl(2,5-dimethyl-N-phenyl-6-azapentalene)(2-methyl-4-(4'-tert-butylphenylindenyl)zirconium dichloride
dimethylsilanediyl(2-methyl-4-thiapentalene)(2-methyl-4-(4'-tert-butylphenylindenyl)zirconium dichloride
dimethylsilanediyl(2-methyl-5-thiapentalene)(2-methyl-4-(4'-tert-butylphenylindenyl)zirconium dichloride
dimethylsilanediyl(2-methyl-6-thiapentalene)(2-methyl-4-(4'-tert-butylphenylindenyl)zirconium dichloride
dimethylsilanediyl(2,5-dimethyl-4-thiapentalene)(2-methyl-4-(4'-tert-butylphenylindenyl)zirconium dichloride
dimethylsilanediyl(2,5-dimethyl-6-thiapentalene)(2-methyl-4-(4'-tert-butylphenylindenyl)zirconium dichloride
dimethylsilanediyl(2-methyl-4-oxapentalene)(2-methyl-4-(4'-tert-butylphenylindenyl)zirconium dichloride
dimethylsilanediyl(2-methyl-5-oxapentalene)(2-methyl-4-(4'-tert-butylphenylindenyl)zirconium dichloride
dimethylsilanediyl(2-methyl-6-oxapentalene)(2-methyl-4-(4'-tert-butylphenylindenyl)zirconium dichloride
dimethylsilanediyl(2,5-dimethyl-4-oxapentalene)(2-methyl-4-(4'-tert-butylphenylindenyl)zirconium dichloride
dimethylsilanediyl(2,5-dimethyl-6-oxapentalene)(2-methyl-4-(4'-tert-butylphenylindenyl)zirconium dichloride
dimethylsilanediyl(2-methyl-4-azapentalene)(2-methyl-4-(4'-n-pentylphenylindenyl)zirconium dichloride
dimethylsilanediyl(2-methyl-5-azapentalene)(2-methyl-4-(4'-n-pentylphenylindenyl)zirconium dichloride
dimethylsilanediyl(2-methyl-6-azapentalene)(2-methyl-4-(4'-n-pentylphenylindenyl)zirconium dichloride
dimethylsilanediyl(2-methyl-N-phenyl-4-azapentalene)(2-methyl-4-(4'-n-pentylphenylindenyl)zirconium dichloride
dimethylsilanediyl(2-methyl-N-phenyl-5-azapentalene)(2-methyl-4-(4'-n-pentylphenylindenyl)zirconium dichloride
dimethylsilanediyl(2-methyl-N-phenyl-6-azapentalene)(2-methyl-4-(4'-n-pentylphenylindenyl)zirconium dichloride
dimethylsilanediyl(2,5-dimethyl-4-azapentalene)(2-methyl-4-(4'-n-pentylphenylindenyl)zirconium dichloride
dimethylsilanediyl(2,5-dimethyl-6-azapentalene)(2-methyl-4-(4'-n-pentylphenylindenyl)zirconium dichloride
dimethylsilanediyl(2,5-dimethyl-N-phenyl-4-azapentalene)(2-methyl-4-(4'-n-pentylphenylindenyl)zirconium dichloride
dimethylsilanediyl(2,5-dimethyl-N-phenyl-6-azapentalene)(2-methyl-4-(4'-n-pentylphenylindenyl)zirconium dichloride
dimethylsilanediyl(2-methyl-4-thiapentalene)(2-methyl-4-(4'-n-pentylphenylindenyl)zirconium dichloride
dimethylsilanediyl(2-methyl-5-thiapentalene)(2-methyl-4-(4'-n-pentylphenylindenyl)zirconium dichloride
dimethylsilanediyl(2-methyl-6-thiapentalene)(2-methyl-4-(4'-n-pentylphenylindenyl)zirconium dichloride
dimethylsilanediyl(2,5-dimethyl-4-thiapentalene)(2-methyl-4-(4'-n-pentylphenylindenyl)zirconium dichloride
dimethylsilanediyl(2,5-dimethyl-6-thiapentalene)(2-methyl-4-(4'-n-pentylphenylindenyl)zirconium dichloride
dimethylsilanediyl(2-methyl-4-oxapentalene)(2-methyl-4-(4'-n-pentylphenylindenyl)zirconium dichloride
dimethylsilanediyl(2-methyl-5-oxapentalene)(2-methyl-4-(4'-n-pentylphenylindenyl)zirconium dichloride
dimethylsilanediyl(2-methyl-6-oxapentalene)(2-methyl-4-(4'-n-pentylphenylindenyl)zirconium dichloride
dimethylsilanediyl(2,5-dimethyl-4-oxapentalene)(2-methyl-4-(4'-n-pentylphenylindenyl)zirconium dichloride
dimethylsilanediyl(2,5-dimethyl-6-oxapentalene)(2-methyl-4-(4'-n-pentylphenylindenyl)zirconium dichloride
dimethylsilanediyl(2-methyl-4-azapentalene)(2-methyl-4-(4'-n-hexylphenylindenyl)zirconium dichloride
dimethylsilanediyl(2-methyl-5-azapentalene)(2-methyl-4-(4'-n-hexylphenylindenyl)zirconium dichloride
dimethylsilanediyl(2-methyl-6-azapentalene)(2-methyl-4-(4'-n-hexylphenylindenyl)zirconium dichloride
dimethylsilanediyl(2-methyl-N-phenyl-4-azapentalene)(2-methyl-4-(4'-n-hexylphenylindenyl)zirconium dichloride
dimethylsilanediyl(2-methyl-N-phenyl-5-azapentalene)(2-methyl-4-(4'-n-hexylphenylindenyl)zirconium dichloride
dimethylsilanediyl(2-methyl-N-phenyl-6-azapentalene)(2-methyl-4-(4'-n-hexylphenylindenyl)zirconium dichloride
dimethylsilanediyl(2,5-dimethyl-4-azapentalene)(2-methyl-4-(4'-n-hexylphenylindenyl)zirconium dichloride
dimethylsilanediyl(2,5-dimethyl-6-azapentalene)(2-methyl-4-(4'-n-hexylphenylindenyl)zirconium dichloride
dimethylsilanediyl(2,5-dimethyl-N-phenyl-4-azapentalene)(2-methyl-4-(4'-n-hexylphenylindenyl)zirconium dichloride
dimethylsilanediyl(2,5-dimethyl-N-phenyl-6-azapentalene)(2-methyl-4-(4'-n-hexylphenylindenyl)zirconium dichloride
dimethylsilanediyl(2-methyl-4-thiapentalene)(2-methyl-4-(4'-n-hexylphenylindenyl)zirconium dichloride
dimethylsilanediyl(2-methyl-5-thiapentalene)(2-methyl-4-(4'-n-hexylphenylindenyl)zirconium dichloride
dimethylsilanediyl(2-methyl-6-thiapentalene)(2-methyl-4-(4'-n-hexylphenylindenyl)zirconium dichloride
dimethylsilanediyl(2,5-dimethyl-4-thiapentalene)(2-methyl-4-(4'-n-hexylphenylindenyl)zirconium dichloride
dimethylsilanediyl(2,5-dimethyl-6-thiapentalene)(2-methyl-4-(4'-n-hexylphenylindenyl)zirconium dichloride
dimethylsilanediyl(2-methyl-4-oxapentalene)(2-methyl-4-(4'-n-hexylphenylindenyl)zirconium dichloride
dimethylsilanediyl(2-methyl-5-oxapentalene)(2-methyl-4-(4'-n-hexylphenylindenyl)zirconium dichloride
dimethylsilanediyl(2-methyl-6-oxapentalene)(2-methyl-4-(4'-n-hexylphenylindenyl)zirconium dichloride
dimethylsilanediyl(2,5-dimethyl-4-oxapentalene)(2-methyl-4-(4'-n-hexylphenylindenyl)zirconium dichloride
dimethylsilanediyl(2,5-dimethyl-6-oxapentalene)(2-methyl-4-(4'-n-hexylphenylindenyl)zirconium dichloride
dimethylsilanediyl(2-methyl-4-azapentalene)(2-methyl-4-(4'-cyclohexylphenylindenyl)zirconium dichloride
dimethylsilanediyl(2-methyl-5-azapentalene)(2-methyl-4-(4'-cyclohexylphenylindenyl)zirconium dichloride
dimethylsilanediyl(2-methyl-6-azapentalene)(2-methyl-4-(4'-cyclohexylphenylindenyl)zirconium dichloride
dimethylsilanediyl(2-methyl-N-phenyl-4-azapentalene)(2-methyl-4-(4'-cyclohexylphenylindenyl)zirconium dichloride dimethylsilanediyl(2-methyl-N-phenyl-5-azapentalene)(2-methyl-4-(4'-cyclohexylphenylindenyl)zirconium dichloride
dimethylsilanediyl(2-methyl-N-phenyl-6-azapentalene)(2-methyl-4-(4'-cyclohexylphenylindenyl)zirconium dichloride
dimethylsilanediyl(2,5-dimethyl-4-azapentalene)(2-methyl-4-(4'-cyclohexylphenylindenyl)zirconium dichloride
dimethylsilanediyl(2,5-dimethyl-6-azapentalene)(2-methyl-4-(4'-cyclohexylphenylindenyl)zirconium dichloride
dimethylsilanediyl(2,5-dimethyl-N-phenyl-4-azapentalene)(2-methyl-4-(4'-cyclohexylphenylindenyl)zirconium dichloride
dimethylsilanediyl(2,5-dimethyl-N-phenyl-6-azapentalene)(2-methyl-4-(4'-cyclohexylphenylindenyl)zirconium dichloride
dimethylsilanediyl(2-methyl-4-thiapentalene)(2-methyl-4-(4'-cyclohexylphenylindenyl)zirconium dichloride
dimethylsilanediyl(2-methyl-5-thiapentalene)(2-methyl-4-(4'-cyclohexylphenylindenyl)zirconium dichloride
dimethylsilanediyl(2-methyl-6-thiapentalene)(2-methyl-4-(4'-cyclohexylphenylindenyl)zirconium dichloride
dimethylsilanediyl(2,5-dimethyl-4-thiapentalene)(2-methyl-4-(4'-cyclohexylphenylindenyl)zirconium dichloride
dimethylsilanediyl(2,5-dimethyl-6-thiapentalene)(2-methyl-4-(4'-cyclohexylphenylindenyl)zirconium dichloride
dimethylsilanediyl(2-methyl-4-oxapentalene)(2-methyl-4-(4'-cyclohexylphenylindenyl)zirconium dichloride
dimethylsilanediyl(2-methyl-5-oxapentalene)(2-methyl-4-(4'-cyclohexylphenylindenyl)zirconium dichloride
dimethylsilanediyl(2-methyl-6-oxapentalene)(2-methyl-4-(4'-cyclohexylphenylindenyl)zirconium dichloride
dimethylsilanediyl(2,5-dimethyl-4-oxapentalene)(2-methyl-4-(4'-cyclohexylphenylindenyl)zirconium dichloride
dimethylsilanediyl(2,5-dimethyl-6-oxapentalene)(2-methyl-4-(4'-cyclohexylphenylindenyl)zirconium dichloride
dimethylsilanediyl(2-methyl-4-azapentalene)(2-methyl-4-(4'-trimethylsilylphenylindenyl)zirconium dichloride
dimethylsilanediyl(2-methyl-5-azapentalene)(2-methyl-4-(4'-trimethylsilylphenylindenyl)zirconium dichloride
dimethylsilanediyl(2-methyl-6-azapentalene)(2-methyl-4-(4'-trimethylsilylphenylindenyl)zirconium dichloride
dimethylsilanediyl(2-methyl-N-phenyl-4-azapentalene)(2-methyl-4-(4'-trimethylsilylphenylindenyl)zirconium dichloride
dimethylsilanediyl(2-methyl-N-phenyl-5-azapentalene)(2-methyl-4-(4'-trimethylsilylphenylindenyl)zirconium dichloride
dimethylsilanediyl(2-methyl-N-phenyl-6-azapentalene)(2-methyl-4-(4'-trimethylsilylphenylindenyl)zirconium dichloride
dimethylsilanediyl(2,5-dimethyl-4-azapentalene)(2-methyl-4-(4'-trimethylsilylphenylindenyl)zirconium dichloride
dimethylsilanediyl(2,5-dimethyl-6-azapentalene)(2-methyl-4-(4'-trimethylsilylphenylindenyl)zirconium dichloride
dimethylsilanediyl(2,5-dimethyl-N-phenyl-4-azapentalene)(2-methyl-4-(4'-trimethylsilylphenylindenyl)zirconium dichloride
dimethylsilanediyl(2,5-dimethyl-N-phenyl-6-azapentalene)(2-methyl-4-(4'-trimethylsilylphenylindenyl)zirconium dichloride
dimethylsilanediyl(2-methyl-4-thiapentalene)(2-methyl-4-(4'-trimethylsilylphenylindenyl)zirconium dichloride
dimethylsilanediyl(2-methyl-5-thiapentalene)(2-methyl-4-(4'-trimethylsilylphenylindenyl)zirconium dichloride
dimethylsilanediyl(2-methyl-6-thiapentalene)(2-methyl-4-(4'-trimethylsilylphenylindenyl)zirconium dichloride
dimethylsilanediyl(2,5-dimethyl-4-thiapentalene)(2-methyl-4-(4'-trimethylsilylphenylindenyl)zirconium dichloride
dimethylsilanediyl(2,5-dimethyl-6-thiapentalene)(2-methyl-4-(4'-trimethylsilylphenylindenyl)zirconium dichloride
dimethylsilanediyl(2-methyl-4-oxapentalene)(2-methyl-4-(4'-trimethylsilylphenylindenyl)zirconium dichloride
dimethylsilanediyl(2-methyl-5-oxapentalene)(2-methyl-4-(4'-trimethylsilylphenylindenyl)zirconium dichloride
dimethylsilanediyl(2-methyl-6-oxapentalene)(2-methyl-4-(4'-trimethylsilylphenylindenyl)zirconium dichloride
dimethylsilanediyl(2,5-dimethyl-4-oxapentalene)(2-methyl-4-(4'-trimethylsilylphenylindenyl)zirconium dichloride
dimethylsilanediyl(2,5-dimethyl-6-oxapentalene)(2-methyl-4-(4'-trimethylsilylphenylindenyl)zirconium dichloride
dimethylsilanediyl(2-methyl-4-azapentalene)(2-methyl-4-(4'-adamantylphenylindenyl)zirconium dichloride
dimethylsilanediyl(2-methyl-5-azapentalene)(2-methyl-4-(4'-adamantylphenylindenyl)zirconium dichloride
dimethylsilanediyl(2-methyl-6-azapentalene)(2-methyl-4-(4'-adamantylphenylindenyl)zirconium dichloride
dimethylsilanediyl(2-methyl-N-phenyl-4-azapentalene)(2-methyl-4-(4'-adamantylphenylindenyl)zirconium dichloride
dimethylsilanediyl(2-methyl-N-phenyl-5-azapentalene)(2-methyl-4-(4'-adamantylphenylindenyl)zirconium dichloride
dimethylsilanediyl(2-methyl-N-phenyl-6-azapentalene)(2-methyl-4-(4'-adamantylphenylindenyl)zirconium dichloride
dimethylsilanediyl(2,5-dimethyl-4-azapentalene)(2-methyl-4-(4'-adamantylphenylindenyl)zirconium dichloride
dimethylsilanediyl(2,5-dimethyl-6-azapentalene)(2-methyl-4-(4'-adamantylphenylindenyl)zirconium dichloride
dimethylsilanediyl(2,5-dimethyl-4-azapentalene)(2-methyl-4-(4'-adamantylphenylindenyl)zirconium dichloride
dimethylsilanediyl(2,5-dimethyl-N-phenyl-4-azapentalene)(2-methyl-4-(4'-adamantylphenylindenyl)zirconium dichloride
dimethylsilanediyl(2,5-dimethyl-N-phenyl-6-azapentalene)(2-methyl-4-(4'-adamantylphenylindenyl)zirconium dichloride
dimethylsilanediyl(2-methyl-4-thiapentalene)(2-methyl-4-(4'-adamantylphenylindenyl)zirconium dichloride
dimethylsilanediyl(2-methyl-5-thiapentalene)(2-methyl-4-(4'-adamantylphenylindenyl)zirconium dichloride
dimethylsilanediyl(2-methyl-6-thiapentalene)(2-methyl-4-(4'-adamantylphenylindenyl)zirconium dichloride
dimethylsilanediyl(2,5-dimethyl-4-thiapentalene)(2-methyl-4-(4'-adamantylphenylindenyl)zirconium dichloride
dimethylsilanediyl(2,5-dimethyl-6-thiapentalene)(2-methyl-4-(4'-adamantylphenylindenyl)zirconium dichloride
dimethylsilanediyl(2-methyl-4-oxapentalene)(2-methyl-4-(4'-adamantylphenylindenyl)zirconium dichloride
dimethylsilanediyl(2-methyl-5-oxapentalene)(2-methyl-4-(4'-adamantylphenylindenyl)zirconium dichloride
dimethylsilanediyl(2-methyl-6-oxapentalene)(2-methyl-4-(4'-adamantylphenylindenyl)zirconium dichloride
dimethylsilanediyl(2,5-dimethyl-4-oxapentalene)(2-methyl-4-(4'-adamantylphenylindenyl)zirconium dichloride
dimethylsilanediyl(2,5-dimethyl-6-oxapentalene)(2-methyl-4-(4'-adamantylphenylindenyl)zirconium dichloride dimethylsilanediyl(2-methyl-4-azapentalene)(2-methyl-4-(4'-tris(trifluoromethyl)methylphenylindenyl)zirconium dichloride dimethylsilanediyl(2-methyl-5-azapentalene)(2-methyl-4-(4'-tris(trifluoromethyl)methylphenylindenyl)zirconium dichloride dimethylsilanediyl(2-methyl-6-azapentalene)(2-methyl-4-(4'-tris(trifluoromethyl)methylphenylindenyl)zirconium dichloride dimethylsilanediyl(2-methyl-N-phenyl-4-azapentalene)(2-methyl-4-(4'-tris(trifluoromethyl)methylphenylindenyl)zirconium dichloride dimethylsilanediyl(2-methyl-N-phenyl-5-azapentalene)(2-methyl-4-(4'-tris(trifluoromethyl)methylphenylindenyl)zirconium dichloride dimethylsilanediyl(2-methyl-N-phenyl-6-azapentalene)(2-methyl-4-(4'-tris(trifluoromethyl)methylphenylindenyl)zirconium dichloride dimethylsilanediyl(2,5-dimethyl-4-azapentalene)(2-methyl-4-(4'-tris(trifluoromethyl)methylphenylindenyl)zirconium dichloride dimethylsilanediyl(2,5-dimethyl-6-azapentalene)(2-methyl-4-(4'-tris(trifluoromethyl)methylphenylindenyl)zirconium dichloride dimethylsilanediyl(2,5-dimethyl-N-phenyl-4-azapentalene)(2-methyl-4-(4'-tris(trifluoromethyl)methylphenylindenyl)zirconium dichloride dimethylsilanediyl(2,5-dimethyl-N-phenyl-6-azapentalene)(2-methyl-4-(4'-tris(trifluoromethyl)methylphenylindenyl)zirconium dichloride dimethylsilanediyl(2-methyl-4-thiapentalene)(2-methyl-4-(4'-tris(trifluoromethyl)methylphenylindenyl)zirconium dichloride dimethylsilanediyl(2-methyl-5-thiapentalene)(2-methyl-4-(4'-tris(trifluoromethyl)methylphenylindenyl)zirconium dichloride dimethylsilanediyl(2-methyl-6-thiapentalene)(2-methyl-4-(4'-tris(trifluoromethyl)methylphenylindenyl)zirconium dichloride dimethylsilanediyl(2,5-dimethyl-4-thiapentalene)(2-methyl-4-(4'-tris(trifluoromethyl)methylphenylindenyl)zirconium dichloride dimethylsilanediyl(2,5-dimethyl-6-thiapentalene)(2-methyl-4-(4'-tris(trifluoromethyl)methylphenylindenyl)zirconium dichloride dimethylsilanediyl(2-methyl-4-oxapentalene)(2-methyl-4-(4'-tris(trifluoromethyl)methylphenylindenyl)zirconium dichloride dimethylsilanediyl(2-methyl-5-oxapentalene)(2-methyl-4-(4'-tris(trifluoromethyl)methylphenylindenyl)zirconium dichloride dimethylsilanediyl(2-methyl-6-oxapentalene)(2-methyl-4-(4'-tris(trifluoromethyl)methylphenylindenyl)zirconium dichloride dimethylsilanediyl(2,5-dimethyl-4-oxapentalene)(2-methyl-4-(4'-tris(trifluoromethyl)methylphenylindenyl)zirconium dichloride dimethylsilanediyl(2,5-dimethyl-6-oxapentalene)(2-methyl-4-(4'-tris(trifluoromethyl)methylphenylindenyl)zirconium dichloride dimethylsilanediyl(2-methyl-4-azapentalene)(2-ethyl-4-(4'-tert-butylphenylindenyl)zirconium dichloride dimethylsilanediyl(2-methyl-5,6-di-hydro-4-azapentalene)(2-ethyl-4-(4'-tert-butylphenylindenyl)zirconium dichloride dimethylsilanediyl(2-methyl-4-azapentalene)(2-ethyl-4-(4'-tert-butylphenyl-tetrahydroindenyl)zirconium dichloride dimethylsilanediyl(2-methyl-5-azapentalene)(2-n-butyl-4-(4'-tert-butylphenylindenyl)zirconium dichloride Ethyliden(2-methyl-6-azapentalene)(2-methyl-4-(4'-tert-butylphenylindenyl)zirconium dichloride dimethylsilanediyl(2-methyl-N-trimethylsilyl-4-azapentalene)(2-methyl-4-(4'-tert-butylphenylindenyl)zirconium dichloride dimethylsilanediyl(2-methyl-N-tolyl-5-azapentalene)(2-n-propyl-4-(4'-tert-butylphenylindenyl)zirconium dichloride Dimethylgermyldiyl(2-methyl-N-phenyl-6-azapentalene)(2-methyl-4-(4'-tert-butylphenylindenyl)zirconium dichloride Methylethyliden(2,5-dimethyl-4-azapentalene)(2-methyl-4-(4'-tert-butylphenylindenyl)zirconium dichloride dimethylsilanediyl(2,5-di-iso-propyl-6-azapentalene)(2-methyl-4-(4'-tert-butylphenylindenyl)zirconium dichloride dimethylsilanediyl(2,5-dimethyl-N-phenyl-4-azapentalene)(2,6-dimethyl-4-(4'-tert-butylphenylindenyl)zirconium dichloride dimethylsilanediyl(2,5-dimethyl-N-phenyl-6-azapentalene)(2-methyl-4-(6'-tert-butylnaphthylindenyl)zirconium dichloride dimethylsilanediyl(2,5-dimethyl-N-phenyl-6-azapentalene)(2-methyl-4-(6'-tert-butylanthracenylindenyl)zirconium dichloride dimethylsilanediyl(2-methyl-4-phosphapentalen)(2-methyl-4-(4'-tert-butylphenylindenyl)zirconium dichloride diphenylsilanediyl(2-methyl-5-thiapentalene)(2-methyl-4-(4'-tert-butylphenylindenyl)zirconium dichloride methylphenylsilanediyl(2-methyl-6-thiapentalene)(2-methyl-4-(4'-tert-butylphenylindenyl)zirconium dichloride methylidene(2,5-dimethyl-4-thiapentalene)(2-methyl-4-(4-tert-butylphenylindenyl)zirconium dichloride dimethylmethylidene(2,5-dimethyl-6-thiapentalene)(2-methyl-4-(4'-tert-butylphenylindenyl)zirconium dichloride diphenylsilanediyl(2,5-dimethyl-4-oxapentalene)(2-methyl-4-(4'-tert-butylphenylindenyl)zirconium dichloride diphenylsilanediyl(2,5-dimethyl-6-oxapentalene)(2-methyl-4-(4'-tert-butylphenylindenyl)zirconium dichloride dimethylsilanediyl(2-methyl-4-azapentalene)(2-methylindenyl)zirconium dichloride dimethylsilanediyl(2-methyl-5-azapentalene)(2-methylindenyl)zirconium dichloride dimethylsilanediyl(2-methyl-6-azapentalene)(2-methylindenyl)zirconium dichloride dimethylsilanediyl(2-methyl-N-phenyl-4-azapentalene)(2-methylindenyl)zirconium dichloride dimethylsilanediyl(2-methyl-N-phenyl-5-azapentalene)(2-methylindenyl)zirconium dichloride dimethylsilanediyl(2-methyl-N-phenyl-6-azapentalene)(2-methylindenyl)zirconium dichloride dimethylsilanediyl(2,5-dimethyl-4-azapentalene)(2-methylindenyl) zirconium dichloride dimethylsilanediyl(2,5-dimethyl-6-azapentalene)(2-methylindenyl) zirconium dichloride dimethylsilanediyl(2,5-dimethyl-N-phenyl-4-azapentalene)(2-methylindenyl)zirconium dichloride dimethylsilanediyl(2,5-dimethyl-N-phenyl-6-azapentalene)(2-methylindenyl)zirconium dichloride dimethylsilanediyl(2-methyl-4-thiapentalene)(2-methylindenyl)zirconium dichloride dimethylsilanediyl(2-methyl-5-thiapentalene) (2-methylindenyl)zirconium dichloride
dimethylsilanediyl(2-methyl-6-thiapentalene) (2-methylindenyl)zirconium dichloride
dimethylsilanediyl(2,5-dimethyl-4-thiapentalene) (2-methylindenyl) zirconium dichloride
dimethylsilanediyl(2,5-dimethyl-6-thiapentalene) (2-methylindenyl) zirconium dichloride
dimethylsilanediyl(2-methyl-4-oxapentalene) (2-methylindenyl) zirconium dichloride
dimethylsilanediyl(2-methyl-5-oxapentalene) (2-methylindenyl) zirconium dichloride
dimethylsilanediyl(2-methyl-6-oxapentalene) (2-methylindenyl) zirconium dichloride
dimethylsilanediyl(2,5-dimethyl-4-oxapentalene) (2-methylindenyl) zirconium dichloride
dimethylsilanediyl(2,5-dimethyl-6-oxapentalene) (2-methylindenyl) zirconium dichloride
dimethylsilanediyl(2-methyl-4-azapentalene) (indenyl) zirconium dichloride
dimethylsilanediyl(2-methyl-5-azapentalene) (indenyl) zirconium dichloride
dimethylsilanediyl(2-methyl-6-azapentalene) (indenyl) zirconium dichloride
dimethylsilanediyl(2-methyl-N-phenyl-4-azapentalene) (indenyl)zirconium dichloride
dimethylsilanediyl(2-methyl-N-phenyl-5-azapentalene) (indenyl)zirconium dichloride
dimethylsilanediyl(2-methyl-N-phenyl-6-azapentalene) (indenyl)zirconium dichloride
dimethylsilanediyl(2,5-dimethyl-4-azapentalene) (indenyl) zirconium dichloride
dimethylsilanediyl(2,5-dimethyl-6-azapentalene) (indenyl) zirconium dichloride
dimethylsilanediyl(2,5-dimethyl-N-phenyl-4-azapentalene) (indenyl) zirconium dichloride
dimethylsilanediyl(2,5-dimethyl-N-phenyl-6-azapentalene) (indenyl) zirconium dichloride
dimethylsilanediyl(2-methyl-4-thiapentalene) (indenyl) zirconium dichloride
dimethylsilanediyl(2-methyl-5-thiapentalene) (indenyl) zirconium dichloride
dimethylsilanediyl(2-methyl-6-thiapentalene) (indenyl) zirconium dichloride
dimethylsilanediyl(2,5-dimethyl-4-thiapentalene) (indenyl) zirconium dichloride
dimethylsilanediyl(2,5-dimethyl-6-thiapentalene) (indenyl) zirconium dichloride
dimethylsilanediyl(2-methyl-4-oxapentalene) (indenyl) zirconium dichloride
dimethylsilanediyl(2-methyl-5-oxapentalene) (indenyl) zirconium dichloride
dimethylsilanediyl(2-methyl-6-oxapentalene) (indenyl) zirconium dichloride
dimethylsilanediyl(2,5-dimethyl-4-oxapentalene) (indenyl) zirconium dichloride
dimethylsilanediyl(2,5-dimethyl-6-oxapentalene) (indenyl) zirconium dichloride
dimethylsilanediyl(2-methyl-4-azapentalene) (2-methyl-4-phenylindenyl)zirconium dichloride
dimethylsilanediyl(2-methyl-5-azapentalene) (2-methyl-4-phenylindenyl)zirconium dichloride
dimethylsilanediyl(2-methyl-6-azapentalene) (2-methyl-4-phenylindenyl)zirconium dichloride
dimethylsilanediyl(2-methyl-N-phenyl-4-azapentalene) (2-methyl-4-phenylindenyl)zirconium dichloride
dimethylsilanediyl(2-methyl-N-phenyl-5-azapentalene) (2-methyl-4-phenylindenyl)zirconium dichloride
dimethylsilanediyl(2-methyl-N-phenyl-6-azapentalene) (2-methyl-4-phenylindenyl)zirconium dichloride
dimethylsilanediyl(2,5-dimethyl-4-azapentalene) (2-methyl-4-phenyl indenyl)zirconium dichloride
dimethylsilanediyl(2,5-dimethyl-6-azapentalene) (2-methyl-4-phenyl indenyl)zirconium dichloride
dimethylsilanediyl(2,5-dimethyl-N-phenyl-4-azapentalene) (2-methyl-4-phenylindenyl)zirconium dichloride
dimethylsilanediyl(2,5-dimethyl-N-phenyl-6-azapentalene) (2-methyl-4-phenylindenyl)zirconium dichloride
dimethylsilanediyl(2-methyl-4-thiapentalene) (2-methyl-4-phenylindenyl)zirconium dichloride
dimethylsilanediyl(2-methyl-5-thiapentalene) (2-methyl-4-phenylindenyl)zirconium dichloride
dimethylsilanediyl(2-methyl-6-thiapentalene) (2-methyl-4-phenylindenyl)zirconium dichloride
dimethylsilanediyl(2,5-dimethyl-4-thiapentalene) (2-methyl-4-phenylindenyl)zirconium dichloride
dimethylsilanediyl(2,5-dimethyl-6-thiapentalene) (2-methyl-4-phenylindenyl)zirconium dichloride
dimethylsilanediyl(2-methyl-4-oxapentalene) (2-methyl-4-phenylindenyl)zirconium dichloride
dimethylsilanediyl(2-methyl-5-oxapentalene) (2-methyl-4-phenylindenyl)zirconium dichloride
dimethylsilanediyl(2-methyl-6-oxapentalene) (2-methyl-4-phenylindenyl)zirconium dichloride
dimethylsilanediyl(2,5-dimethyl-4-oxapentalene) (2-methyl-4-phenylindenyl)zirconium dichloride
dimethylsilanediyl(2,5-dimethyl-6-oxapentalene) (2-methyl-4-phenylindenyl)zirconium dichloride
dimethylsilanediyl(2-methyl-4-azapentalene) (2-methyl-4,5-benzoindenyl)zirconium dichloride
dimethylsilanediyl(2-methyl-5-azapentalene) (2-methyl-4,5-benzoindenyl)zirconium dichloride
dimethylsilanediyl(2-methyl-6-azapentalene) (2-methyl-4,5-benzoindenyl)zirconium dichloride
dimethylsilanediyl(2-methyl-N-phenyl-4-azapentalene) (2-methyl-4,5-benzoindenyl)zirconium dichloride
dimethylsilanediyl(2-methyl-N-phenyl-5-azapentalene) (2-methyl-4,5-benzoindenyl)zirconium dichloride
dimethylsilanediyl(2-methyl-N-phenyl-6-azapentalene) (2-methyl-4,5-benzoindenyl)zirconium dichloride
dimethylsilanediyl(2,5-dimethyl-4-azapentalene) (2-methyl-4,5-benzoindenyl)zirconium dichloride
dimethylsilanediyl(2,5-dimethyl-6-azapentalene) (2-methyl-4,5-benzoindenyl)zirconium dichloride
dimethylsilanediyl(2,5-dimethyl-N-phenyl-4-azapentalene) (2-methyl-4,5-benzoindenyl)zirconium dichloride
dimethylsilanediyl(2,5-dimethyl-N-phenyl-6-azapentalene) (2-methyl-4,5-benzoindenyl)zirconium dichloride
dimethylsilanediyl(2-methyl-4-thiapentalene) (2-methyl-4,5-benzoindenyl)zirconium dichloride
dimethylsilanediyl(2-methyl-5-thiapentalene) (2-methyl-4,5-benzoindenyl)zirconium dichloride
dimethylsilanediyl(2-methyl-6-thiapentalene) (2-methyl-4,5-benzoindenyl)zirconium dichloride
dimethylsilanediyl(2,5-dimethyl-4-thiapentalene) (2-methyl-4,5-benzoindenyl)zirconium dichloride
dimethylsilanediyl(2,5-dimethyl-6-thiapentalene) (2-methyl-4,5-benzoindenyl)zirconium dichloride
dimethylsilanediyl(2-methyl-4-oxapentalene) (2-methyl-4,5-benzoindenyl)zirconium dichloride
dimethylsilanediyl(2-methyl-5-oxapentalene) (2-methyl-4,5-benzoindenyl)zirconium dichloride
dimethylsilanediyl(2-methyl-6-oxapentalene) (2-methyl-4,5-benzoindenyl)zirconium dichloride
dimethylsilanediyl(2,5-dimethyl-4-oxapentalene) (2-methyl-4,5-benzoindenyl)zirconium dichloride dimethylsilanediyl(2,5-dimethyl-6-oxapentalene)
  (2-methyl-4,5-benzoindenyl)zirconium dichloride
dimethylsilanediylbis(2-methyl-4-azapentalene)zirconium
  dichloride
dimethylsilanediylbis(2-methyl-5-azapentalene)zirconium
  dichloride
dimethylsilanediylbis(2-methyl-6-azapentalene)zirconium
  dichloride
dimethylsilanediylbis(2-methyl-N-phenyl-4-azapentalene)
  zirconium dichloride
dimethylsilanediylbis(2-methyl-N-phenyl-5-azapentalene)
  zirconium dichloride
dimethylsilanediylbis(2-methyl-N-phenyl-6-azapentalene)
  zirconium dichloride
dimethylsilanediylbis(2,5-dimethyl-4-azapentalene)
  zirconium dichloride
dimethylsilanediylbis(2,5-dimethyl-6-azapentalene)
  zirconium dichloride
dimethylsilanediylbis(2,5-dimethyl-N-phenyl-4-
  azapentalene)zirconium dichloride
dimethylsilanediylbis(2,5-dimethyl-N-phenyl-6-
  azapentalene)zirconium dichloride
dimethylsilanediylbis(2-methyl-4-thiapentalene)zirconium
  dichloride
dimethylsilanediylbis(2-methyl-5-thiapentalene)zirconium
  dichloride
dimethylsilanediylbis(2-methyl-6-thiapentalene)zirconium
  dichloride
dimethylsilanediylbis(2,5-dimethyl-4-thiapentalene)
  zirconium dichloride
dimethylsilanediylbis(2,5-dimethyl-6-thiapentalene)
  zirconium dichloride
dimethylsilanediylbis(2-methyl-4-oxapentalene)zirconium
  dichloride
dimethylsilanediylbis(2-methyl-5-oxapentalene)zirconium
  dichloride
dimethylsilanediylbis(2-methyl-6-oxapentalene)zirconium
  dichloride
dimethylsilanediylbis(2,5-dimethyl-4-oxapentalene)
  zirconium dichloride
dimethylsilanediylbis(2,5-dimethyl-6-oxapentalene)
  zirconium dichloride Further examples of metallocenes which can be used for the purposes of the present invention are metallocenes as listed above in which the zirconium fragment "zirconium dichloride" is replaced by
zirconium monochloride mono(2,4-di-tert-butylphenoxide)
zirconium monochloride mono(2,6-di-tert-butylphenoxide)
zirconium monochloride mono(3,5-di-tert-butylphenoxide)
zirconium monochloride mono(2,6-di-sec-butylphenoxide)
zirconium monochloride mono(2,4-di-methylphenoxide)
zirconium monochloride mono(2,3-di-methylphenoxide)
zirconium monochloride mono(2,5-di-methylphenoxide)
zirconium monochloride mono(2,6-di-methylphenoxide)
zirconium monochloride mono(3,4-di-methylphenoxide)
zirconium monochloride mono(3,5-di-methylphenoxide)
zirconium monochloride monophenoxide
zirconium monochloride mono(2-methylphenoxide)
zirconium monochloride mono(3-methylphenoxide)
zirconium monochloride mono(4-methylphenoxide)
zirconium monochloride mono(2-ethylphenoxide)
zirconium monochloride mono(3-ethylphenoxide)
zirconium monochloride mono(4-ethylphenoxide)
zirconium monochloride mono(2-sec-butylphenoxide)
zirconium monochloride mono(2-tert-butylphenoxide)
zirconium monochloride mono(3-tert-butylphenoxide)
zirconium monochloride mono(4-sec-butylphenoxide)
zirconium monochloride mono(4-tert-butylphenoxide)
zirconium monochloride mono(2-isopropyl-5-methylphenoxide)
zirconium monochloride mono(4-isopropyl-3-methylphenoxide)
zirconium monochloride mono(5-isopropyl-2-methylphenoxide)
zirconium monochloride mono(5-isopropyl-3-methylphenoxide)
zirconium monochloride mono(2,4-bis-(2-methyl-2-butyl)-phenoxide)
zirconium monochloride mono(2,6-di-tert-butyl-4-methyl-phenoxide)
zirconium monochloride mono(4-nonylphenoxide)
zirconium monochloride mono(1-naphthoxide)
zirconium monochloride mono(2-naphthoxide)
zirconium monochloride mono(2-phenylphenoxide)
zirconium monochloride mono(tert-butoxid)
zirconium monochloride mono(N-methylanilide)
zirconium monochloride mono(2-tert-butylanilide)
zirconium monochloride mono(tert-butylamide)
zirconium monochloride mono(diisopropylamide)
zirconium monochloride monomethyl
zirconium monochloride monobenzyl
zirconium monochloride mononeopentyl.

Preference is also given to the corresponding dimethylzirconium compounds, the corresponding $\eta^4$-butadienezirconium compounds and the corresponding compounds having a 1,2-(1-methylethanediyl), 1,2-(1,1-dimethylethanediyl) or 1,2-(1,2-dimethylethanediyl) bridge.

The catalyst system of the present invention can further comprise an organometallic compound of the formula (IV)

$$[M^5R^{20}{}_p]_q \qquad (IV)$$

where
  $M^5$ is an element of main group I, II or III of the Periodic Table of the Elements, preferably lithium, magnesium or aluminum, in particular aluminum,
  $R^{20}$ are identical or different and are each a hydrogen atom, a halogen atom or a $C_1$–$C_{40}$ group such as $C_1$–$C_{20}$-alkyl, $C_6$–$C_{40}$-aryl, $C_7$–$C_{40}$-arylalkyl or $C_7$–$C_{40}$-alkylaryl,
  p is an integer from 1 to 3 and
  q is an integer from 1 to 4.

The organometallic compounds of the formula (IV) are likewise unchanged Lewis acids.

Examples of preferred organometallic compounds of the formula (IV) are trimethylaluminum, triethylaluminum, triisopropylaluminum, trihexylaluminum, trioctylaluminum, tri-n-butylaluminum, tri-n-propylaluminum, triisoprenylaluminum, dimethylaluminum monochloride, diethylaluminum monochloride, diisobutylaluminum monochloride, methylaluminum sesquichloride, ethylaluminum sesquichloride, dimethylaluminum hydride, diethylaluminum hydride, diisopropylaluminum hydride, dimethylaluminum trimethylsiloxide, dimethylaluminum triethylsiloxide, phenylalane, pentafluorophenylalane, o-tolylalane.

The catalyst system of the present invention is obtainable by reacting a Lewis base of the formula (I) and an organoboron or organoaluminum compound made up of units of the formula (II) with a support. This is followed by reaction with a solution or suspension of one or more metallocene compounds of the formula (III) and optionally one or more organometallic compounds of the formula (IV).

The activation of the catalyst system can thereby be carried out either before its introduction into the reactor or else only in the reactor itself. The present invention also describes a process for preparing polyolefins. The addition of a further chemical compound as additive prior to the polymerization can be of additional advantage.

To prepare the catalyst system of the present invention, the support material is suspended in an organic solvent. Suitable solvents are aromatic or aliphatic solvents such as hexane, heptane, toluene or xylene or halogenated hydrocarbons such as methylene chloride or halogenated aromatic hydrocarbons such as o-dichlorobenzene. The support can be pretreated beforehand with a compound of the formula (IV). Subsequently, one or more compounds of the formula (I) is/are added to this suspension, with the reaction time being able to be from 1 minute to 48 hours, preferably from 10 minutes to 2 hours. The product can be isolated from the reaction solution and subsequently resuspended, or else the reaction solution can be reacted directly with a cocatalytically active organoboron or organoaluminum compound of the formula (II). The reaction time here is from 1 minute to 48 hours, preferably from 10 minutes to 2 hours. To prepare the catalyst system of the present invention, one or more Lewis bases of the formula (I) can be reacted with one or more cocatalytically active organoboron or organoaluminum compounds of the formula (II). Preference is given to reacting from 1 to 4 equivalents of a Lewis base of the formula (I) with one equivalent of a cocatalytically active compound. Particular preference is given to reacting one equivalent of a Lewis base of the formula (I) with one equivalent of a cocatalytically active compound. The reaction product of this reaction is a metallocenium-forming compound which fixed covalently to the support material. It will hereinafter be referred to as modified support material. The reaction mixture is subsequently filtered and the solid washed with one of the abovementioned solvents. The modified support material is then dried in a high vacuum. However, the addition of the individual components can also be carried out in any other order.

The application of one or more metallocene compounds, preferably of the formula (III), and one or more organometallic compounds of the formula (IV) to the modified support material is preferably carried out by dissolving or suspending one or more metallocene compounds of the formula (III) in one of the above-described solvents and subsequently reacting it with one or more compounds of the formula (IV), which is/are preferably likewise in dissolved or suspended form. The stoichiometric ratio of metallocene compound of the formula (III) to organometallic compound of the formula (IV) is from 100:1 to $10^{-4}$:1. The ratio is preferably from 1:1 to $10^{-2}$:1. The modified support material can be placed together with one of the abovementioned solvents either directly in the polymerization reactor or in a reaction flask. This is followed by the addition of the mixture of a metallocene compound of the formula (III) and an organometallic compound of the formula (IV). However, it is also possible for one or more metallocene compounds of the formula (III) to be added to the modified support material without prior addition of an organometallic compound of the formula (IV).

The ratio of modified support to metallocene compound of the formula (III) is preferably from 10 g:1 $\mu$mol to $10^{-2}$ g:1 $\mu$mol. The stoichiometric ratio of metallocene compound of the formula (III) to the cocatalytically active chemical compound of the formula (II) is from 100:1 to $10^{-4}$:1, preferably from 1:1 to $10^{-2}$:1.

The supported catalyst system can be used directly for polymerization. However, it is also possible for the solvent to be removed and the solid then to be used in resuspended form for the polymerization. The advantage of this activation method is that it offers the option of allowing the polymerization-active catalyst system to be formed only in the reactor. This prevents partial decomposition of the air-sensitive catalyst from occurring during its introduction into the reactor.

The present invention also describes a process for preparing an olefin polymer in the presence of the catalyst system of the present invention. The polymerization can be either a homopolymerization or a copolymerisation.

Preference is given to polymerizing olefins of the formula R—CH═CH—$R^\beta$, where R and $R^\beta$ are identical or different and are each a hydrogen atom, a halogen atom, an alkoxy, hydroxy, hydroxyalkyl, aldehyde, carboxylic acid or carboxylic ester group or a saturated or unsaturated hydrocarbon radical having from 1 to 20 carbon atoms, in particular from 1 to 10 carbon atoms, which may be substituted by an alkoxy, hydroxy, hydroxyalkyl, aldehyde, carboxylic acid or carboxylic ester group, or $R^\alpha$ and $R^\beta$ together with the atoms connecting them form one or more rings. Examples of such olefins are 1-olefins such as ethylene, propylene, 1-butene, 1-hexene, 4-methyl-1-pentene, 1-octene, styrene, cyclic olefins such as norbornene, vinylnorbornene, tetracyclododecene, ethylidenenorbornene, dienes such as 1,3-butadiene or 1,4-hexadiene, biscyclopentadiene or methyl methacrylate.

Particular preference is given to homopolymerizing propylene or ethylene, copolymerizing ethylene with one or more $C_3$–$C_{20}$-1-olefins, in particular propylene, and/or one or more $C_4$–$C_{20}$-dienes, in particular 1,3-butadiene, or copolymerizing norbornene and ethylene.

The polymerization is preferably carried out at from −60 to 300° C., particularly preferably from 30 to 250° C. The pressure is from 0.5 to 2500 bar, preferably from 2 to 1500 bar. The polymerization can be carried out continuously or batchwise, in one or more stages, in solution, in suspension, in the gas phase or in a supercritical medium.

The supported catalyst system can either be formed directly in the polymerization system or it can be isolated as a dry powder or as a powder still moist with solvent and then resuspended and metered as a suspension in an inert suspension medium into the polymerization system.

A prepolymerization can be carried out with the aid of the catalyst system of the present invention. The prepolymerization is preferably carried out using the (or one of the) olefin(s) used in the polymerization.

To prepare olefin polymers having a broad molecular weight distribution, preference is given to using catalyst systems comprising two or more different transition metal compounds, e.g. metallocenes.

To remove catalyst poisons present in the olefin, purification using an aluminum alkyl, for example trimethylaluminum, triethylaluminum or triisobutylaluminum, is advantageous. This purification can be carried out either in the polymerization system itself or the olefin is brought into contact with the Al compound and subsequently separated off again prior to introduction into the polymerization system.

As molar mass regulator and/or to increase the activity, hydrogen is added if necessary. The total pressure in the polymerization system is from 0.5 to 2500 bar, preferably from 2 to 1500 bar.

The catalyst system of the present invention is employed in a concentration, based on the transition metal, of preferably from $10^{-3}$ to $10^{-8}$ mol, more preferably from $10^{-4}$ to $10^{-7}$ mol, of transition metal per $dm^3$ of solvent or per $dm^3$ of reactor volume.

Suitable solvents for preparing both the supported chemical compound according to the present invention and also the catalyst system of the present invention are aliphatic or aromatic solvents such as hexane or toluene, ether solvents such as tetrahydrofuran or diethyl ether or halogenated hydrocarbons such as methylene chloride or halogenated aromatic hydrocarbons such as o-dichlorobenzene.

Before introduction of the catalyst system of the present invention or before activation of the catalyst system of the present invention in the polymerization system, an alkylalumiunum compound such as trimethylaluminum, triethylaluminum, triisobutylaluminum, trioctylaluminum or isoprenylaluminum can additionally be introduced into the reactor to make the polymerization system inert (for example to remove catalyst poisons present in the olefin). This is added to the polymerization system in a concentration of from 200 to 0.001 mmol of Al per kg of reactor content. Preference is given to using triisobutylaluminum or triethylaluminum in a concentration of from 10 to 0.01 mmol of Al per kg of reactor contents; in this way, a low $Al/M^1$ molar ratio can be chosen in the synthesis of a supported catalyst system.

In addition, an additive such as an antistatic can be used in the process of the present invention, e.g. for improving the particle morphology of the polymer.

It is generally possible to use all antistatics which are suitable for polymerization. Examples are salt mixtures of calcium salts of Medialan acid and chromium salts of N-stearylanthranilic acid as described in DE-A-3,543,360. Further suitable antistatics are, for example, $C_{12}$–$C_{22}$-fatty acid soaps of alkali metals or alkaline earth metals, salts of sulfonic esters, esters of polyethylene glycols with fatty acids, polyoxyethylene alkyl ethers, etc. An overview of antistatics is given in EP-A-0,107,127.

It is also possible to use a mixture of a metal salt of Medialan acid, a metal salt of anthranilic acid and a polyamine as antistatic, as described in EP-A-0,636,636.

Commercially available products such as Stadis® 450 from DuPont, namely a mixture of toluene, isopropanol, dodecylbenzenesulfonic acid, a polyamine, a copolymer of 1-decene and $SO_2$ and also 1-decene, or ASA®-3 from Shell and ARU5R® 163 from ICI can likewise be used.

The antistatic is preferably used as a solution; in the preferred case of Stadis® 450, preference is given to using from 1 to 50% by weight of this solution, preferably from 5 to 25% by weight, based on the mass of the support catalyst used (support together with covalently bound metallocenium-forming compound and one or more metallocene compounds, e.g. of the formula IV). However, the amount of antistatic required can vary within a wide range, depending on the type of antistatic used.

The following examples illustrate the invention.

General procedures: Preparation and handling of the compounds were carried out in the absence of air and moisture under argon (Schlenk technique). All solvents required were dried before use by boiling for a number of hours over suitable desiccants and subsequent distillation under argon. To characterize the compounds, samples were taken from the individual reaction mixtures and dried in an oilpump vacuum.

EXAMPLE 1

Synthesis of Bis(pentafluorophenyloxy) methylalane (1)

5.2 ml of trimethylaluminum (2M in Exxol, 10.8 mmol) together with 40 ml of toluene are placed in a reaction vessel and cooled to −40° C. 4.0 g (21.6 mmol) of pentafluorophenol in 40 ml of toluene are added dropwise to this solution over a period of 30 minutes. The mixture is stirred for 15 minutes at −40° C. and the reaction solution is subsequently allowed to warm to room temperature. It is stirred for another one hour at room temperature. This results in a colorless solution (0.14 M based on Al) of bis (pentafluorophenyloxy)methylalane.

19F-NMR ($C_6D_6$): δ=−160.5 ppm (m, 4F,o-$C_6F_5$); −161.8 ppm (m, 2F, p-$C_6F_5$); −166.3 ppm (m, 4F, m-$C_6F_5$).

1H-NMR ($C_6D_6$): δ=−0.4 ppm (s, 3H, $CH_3$).

EXAMPLE 2

Synthesis of Bis(pentafluorophenyloxy) ethylalane (2)

5.0 ml of triethylaluminum (2.1 M in Varsol, 10.5 mmol) together with 40 ml of toluene are placed in a reaction vessel and cooled to −40° C. 4.0 g (21.0 mmol) of pentafluorophenol in 40 ml of toluene are added dropwise to this solution over a period of 30 minutes. The mixture is stirred for 15 minutes at −40° C. and the reaction solution is subsequently allowed to warm to room temperature. It is stirred for another one hour at room temperature. This results in a colorless solution (0.13 M based on Al) of bis (pentafluorophenyloxy)ethylalane.

19F-NMR ($C_6D_6$): δ=−160.9 ppm (m, 4F,o-$C_6F_5$); −162.1 ppm (m, 2F, p-$C_6F_5$); −167.3 ppm (m, 4F, m-$C_6F_5$)

1H-NMR ($C_6D_6$): δ=0.5 ppm (t, 3H, $CH_3$), 1.6 ppm (q, 2H, $CH_2$).

EXAMPLE 3

Synthesis of Bis(pentafluoroanilino)methylalane (3)

5.0 ml of trimethylaluminum (2.1 M in Exxol, 10.5 mmol) together with 40 ml of toluene are placed in a reaction vessel and cooled to −40° C. 3.8 g (21.0 mmol) of pentafluoroaniline in 40 ml of toluene are added dropwise to this solution over a period of 30 minutes. The mixture is stirred for 15 minutes at −40° C. and the reaction solution is subsequently allowed to warm to room temperature. It is stirred for another two hours at room temperature. This results in a yellowish solution (0.13 M based on Al) of bis (pentafluoroanilino)methylalane.

19F-NMR ($C_6D_6$): δ=−162.9 ppm (m, 4F,o-$C_6F_5$); −164.1 ppm (m, 2F, p-$C_6F_5$); −171.3 ppm (m, 4F, m-$C_6F_5$)

1H-NMR ($C_6D_6$): δ=−0.4 ppm (t, 3H, $CH_3$), 5.6 ppm (s, 1H, NH).

EXAMPLE 4

Synthesis of Bis(bis(pentafluorophenyl)methoxy) methylalane (4)

5.0 ml of trimethylaluminum (2.1 M in Exxol, 10.5 mmol) together with 40 ml of toluene are placed in a reaction vessel and cooled to −40° C. 7.6 g (21.0 mmol) of bis (pentafluorophenyl) carbinol in 40 ml of toluene are added dropwise to this solution over a period of 30 minutes. The mixture is stirred for 15 minutes at −40° C. and the reaction solution is subsequently allowed to warm to room temperature. It is stirred for another two hours at room temperature. This results in a yellowish solution (0.13 M based on Al) of bis(bis(pentafluorophenyl)methoxy)methylalane.

19F-NMR ($C_6D_6$): δ=−140.6 ppm (m, 4F, o-CH($C_6F_5$)$_2$); −151.7 ppm (m, 2F, p-CH($C_6F_5$)$_2$); −159.5 ppm (m, 4F, m-CH($C_6F_5$)$_2$).

1H-NMR ($C_6D_6$): δ=6.2 ppm (s, 1H, CH).

EXAMPLE 5

Synthesis of Bis(3,5 Bis(trifluoromethyl)anilino) methylalane (5)

5.0 ml of trimethylaluminum (2.1 M in Exxol, 10.5 mmol) together with 40 ml of toluene are placed in a reaction vessel and cooled to −40° C. 4.8 g (21.0 mmol) of 3,5-bis (trifluoromethyl)aniline in 40 ml of toluene are added dropwise to this solution over a period of 45 minutes. The mixture is stirred for 15 minutes at −40° C. and the reaction solution is subsequently allowed to warm to room temperature. It is stirred for another four hours at room temperature. The slightly turbid solution is filtered through a G4 frit. This results in a clear yellowish solution (0.13 M based on Al) of bis(3,5-bis(trifluoromethyl)anilino)methylalane.

19F-NMR ($C_6D_6$): δ=−61.5 ppm (s, 12F, $CF_3$).

1H-NMR ($C_6D_6$): δ=5.5 ppm (s, 1H, NH), 6.3 ppm (s, 2H, Ar—H), 7.2 ppm (s, 1H, Ar—H).

EXAMPLE 6

Synthesis of Bis(nonafluorobiphenyloxy) methylalane (6)

5.0 ml of trimethylaluminum (2.1 M in Exxol, 10.5 mmol) together with 40 ml of toluene are placed in a reaction vessel and cooled to −40° C. 7.0 g (21.0 mmol) of nonafluorobiphenyl-1-ol in 40 ml of toluene are added dropwise to this solution over a period of 40 minutes. The mixture is stirred for 30 minutes at −40° C. and the reaction solution is subsequently allowed to warm to room temperature. It is stirred for another one hour at room temperature. The slightly turbid solution is filtered through a G4 frit. This results in a clear solution (0.13 M based on Al) of bis (nonafluorobiphenyloxy)methylalane.

19F-NMR ($C_6D_6$): δ=−134.0 ppm (m, 2F, 2,2'-F); −137.2 ppm (m, 2F, 3, 3'-F); −154.6 ppm (m, 2F, 4, 4'-F); 157.0 ppm (m, 1F, 6-F); 161.7 (m, 2F, 5, 5'-F).

1H-NMR ($C_6D_6$): δ=−0.3 ppm (s, 3H, $CH_3$).

General Description of the Application to a Support, the Preparation of the Catalyst and the Polymerization Procedure A) Application to a support 14.0 g of $SiO_2$ (XPO 2107, from Grace, dried at 600° C. in a stream of argon) together with 20 ml of toluene are placed in a reaction vessel, 2.6 ml of N,N-dimethylaniline (20.80 mmol) are added dropwise and the mixture is stirred at room temperature for two hours. 20.80 mmol of the appropriate cocatalyst, dissolved in 40 ml of toluene, are subsequently added to 0° C. The suspension is allowed to warm to room temperature and is stirred for two hours at this temperature. The resulting bluish suspension is filtered and the residue is washed with 50 ml of toluene and then three times with 100 ml each time of n-pentane. The residue is subsequently dried in an oil pump vacuum. This gives the supported cocatalyst system, which is weighed.

B) Preparation of the catalyst system 0.30 ml of trimethylaluminum (20% strength in Exxol, 700 μmol) is added to a solution of 50 mg (80 μmol) of dimethylsilanediylbis(2-methyl-4-phenylindenyl)zirconium dichloride in 50 ml of toluene, and the solution is stirred at RT for 1.5 hours. 960 μmol/g of [$SiO_2$] of the cocatalyst prepared under A Application to a support are subsequently added a little at a time. The mixture is stirred at room temperature for 30 minutes. The solvent is then removed in an oil pump vacuum. This gives a light-red free-flowing powder.

EXAMPLE 4

Polymerization

For introduction into the polymerization system, the appropriate amount of the supported catalyst system (6 μmil of metallocene) prepared under B is resuspended in 30 ml of Exxol.

In parallel thereto, a dry 16 $dm^3$ reactor is flushed firstly with nitrogen and subsequently with propylene and charged with 10 $dm^3$ of liquid propene. 0.5 $cm^3$ of a 20% strength triisobutylaluminum solution in Varsol diluted with 30 $cm^3$ of Exxol was then introduced into the reactor and the mixture was stirred at 30° C. for 15 minutes. The catalyst suspension was subsequently introduced into the reactor. The reaction mixture was heated to the polymerization temperature of 60° C. (4° C./min) and the polymerization system was maintained at 60° C. for 1 hour by means of cooling. The polymerization was stopped by venting the remaining propylene. The polymer is dried in a vacuum drying oven. The reactor displayed no deposits on the interior wall or stirrer.

Polymerization Results

| Supported catalyst system prepared from product from Example: | 1 | 2 | 3 | 4 | 5 | 6 |
| --- | --- | --- | --- | --- | --- | --- |
| Amount of metallocene [mg] | 50 | 50 | 50 | 50 | 50 | 50 |
| Metallocene (mmol) | 80 | 80 | 80 | 80 | 80 | 80 |
| Cocatalyst (mmol) | 960 | 960 | 960 | 960 | 960 | 960 |
| $SiO_2$ weighed in [g] | 14.0 | 14.0 | 14.0 | 14.0 | 14.0 | 14.0 |
| $SiO_2$ weighed out [g] | 19.95 | 19.28 | 19.46 | 23.60 | 21.49 | 23.49 |
| Amount of supported cocatalyst weighed in [mg] | 923 | 1074 | 1000 | 1074 | 893 | 997 |

| -continued | | | | | | |
|---|---|---|---|---|---|---|
| Supported catalyst system prepared from product from Example: | 1 | 2 | 3 | 4 | 5 | 6 |
| Amount of catalyst system weighed out [mg] | 975 | 1124 | 1050 | 1124 | 943 | 1047 |
| Amount of catalyst system weighed in for polymerization [mg] [6 mmol of metallocene] | 73 | 85 | 79 | 85 | 71 | 79 |
| Time (min) | 60 | 60 | 60 | 60 | 60 | 60 |
| PP (kg) | 0.622 | 0.480 | 0.484 | 0.589 | 0.281 | 0.589 |
| Activity[1)] | 166 | 128 | 129 | 157 | 75 | 157 |

[1)]Activity: kg of (PP)/g of metallocene × h

We claim:

1. A catalyst system comprising:

A) at least one metallocene,

B) at least one Lewis base of the formula I $M^1R^3R^4R^5$ (I)

wherein $R^3$, $R^4$ and $R^5$ are identical or different and are each a hydrogen atom, a halogen atom, a $C_1$–$C_{20}$-alkyl, $C_1$–$C_{20}$-haloalkyl, $C_{6-C40}$-aryl, $C_6$–$C_{40}$-haloaryl, $C_7$–$C_{40}$-alkylaryl or $C_7$–$C_{40}$-arylalkyl group or two or all three of the radicals $R^3$, $R^4$ and $R^5$ may be joined to one another via $C_2$–$C_{20}$ units, $M^1$ is an element of main group V of the Periodic Table of the Elements, C) at least one support, D) and at least one organoboron or organoaluminum compound which is made up of units of the formula II $[(R^6)-X-M^2(R^8)-X-(R^7)]_k$ (II)

wherein $R^6$ and $R^7$ are identical or different and are each a hydrogen atom, a halogen atom, a boron-free $C_1$–$C_{40}$ group or an $Si(R^9)_3$ group, where $R^9$ is a boron-free $C_1$–$C_{40}$ group, $R^8$ can be identical to or different from $R^6$ and $R^7$ and is a hydrogen atom, a halogen atom, a $C_1$–$C_{40}$ group or an $OSi(R^9)_3$ group, X may be identical or different and are each an element of group V or VIa of the Periodic Table of the Elements or an NH group, $M^2$ is an element of group IIIa of the Periodic Table of the Elements and k is a natural number from 1 to 100, and is covalently bound to the support.

2. The catalyst system as claimed in claim 1, which further comprises an organometallic compound of the formula (IV)

$[M^5R^{20}{}_p]_q$ (VI)

wherein $M^5$ is an element of main group I, II or III of the Periodic Table of the Elements, $R^{20}$ are identical or different and are each a hydrogen atom, a halogen atom or a $C_1$–$C_{40}$ group, p is an integer from 1 to 3 and q is an integer from 1 to 4.

3. The catalyst system as claimed in claim 1, wherein $M^1$ is nitrogen or phosphorus.

4. The catalyst system as claimed in claim 3, wherein $R^6$ and $R^7$ are identical or different and are each a hydrogen atom, a halogen atom, a $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl, $C_7$–$C_{40}$-haloalkylaryl or an $Si(R^9)_3$ group, $R^9$ is a $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl, $C_7$–$C_{40}$-haloalkylaryl, $R^8$ is a hydrogen atom, a halogen atom, $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl, $C_7$–$C_{40}$-haloalkylaryl or an $OSi(R^9)_3$ group.

5. The catalyst system as claimed in claim 1, wherein the compound of the formula II is selected from the group consisting of

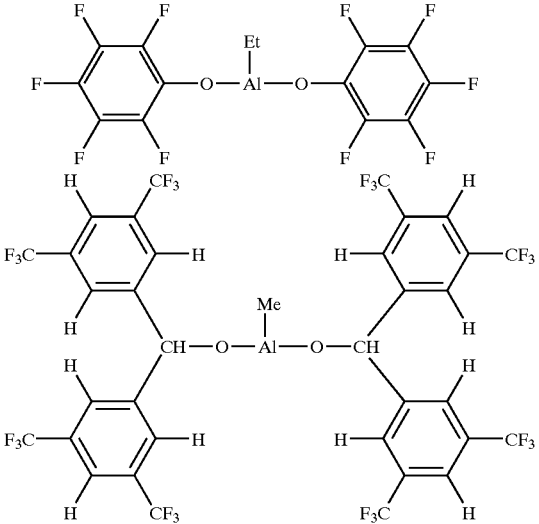

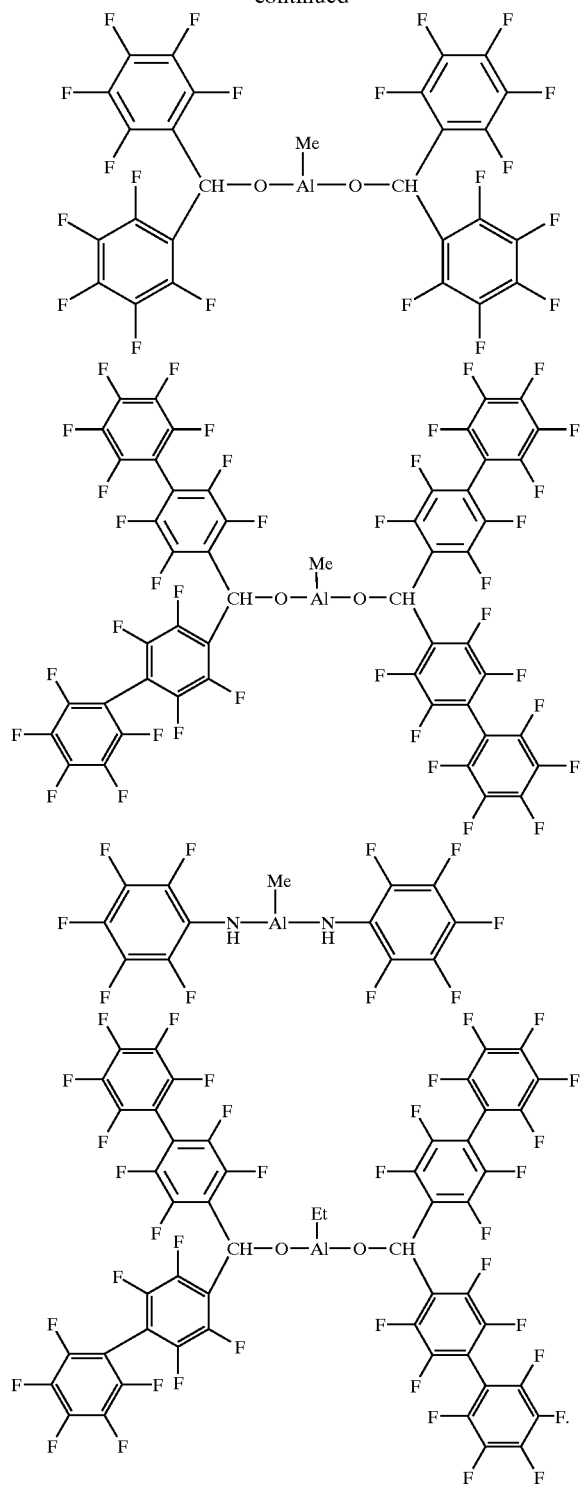

6. The catalyst system as claimed in claim 4, wherein $M^2$ is boron.

7. The catalyst system as claimed in claim 1, wherein $R^8$ is hydrogen atom, a halogen atom, a $C_2$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl, $C_7$–$C_{40}$-haloalkylaryl or an $OSi(R^9)_3$ group.

8. The catalyst system as claimed in claim 5, wherein said at least one support is talc, an inorganic oxide or a polymer powder.

9. The catalyst system as claimed in claim 1, wherein said at least one support is talc, polyolefin powder, MgO, $ZrO_2$, $TiO_2$, aluminum oxide or $B_2O_3$.

10. The catalyst system as claimed in claim 2, wherein $M^5$ is lithium or aluminum and $R^{20}$ are identical or different in each area hydrogen atom, a halogen atom, a $C_1$–$C_{20}$-alkyl, $C_6$–$C_{40}$-aryl, $C_7$–$C_{40}$-arylalkyl or $C_7$–$C_{40}$-alkylaryl.

11. The catalyst system as claimed in claim 5, which further comprises a trimethylaluminum, triethylaluminum, triisopropylaluminum, trihexylaluminum, tricotyluminum, tri-n-butylaluminum, tri-n-propylaluminum, triisoprenylaluminum, dimethylaluminum monochloride, diethylaluminum monochloride, diisobutylaluminum monochloride, methylaluminum sesquichloride, ethylaluminum sesquichloride, dimethyaluminum hydride, diethylaluminum hydride, diisopropylaluminum hydride, dimethylaluminum trimethylsiloxide, dimethylaluminum triethylsiloxide, phenylalane, pentafluorophenylalane, or o-tolylalane.

12. The catalyst system as claimed in claim 1, wherein the at least one metallocene is of the formula III.

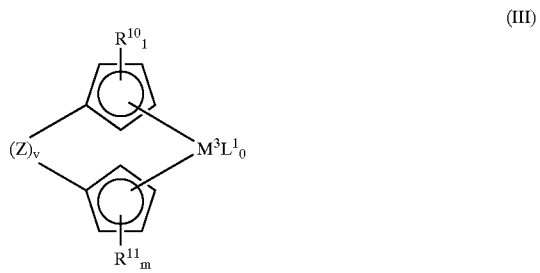

where $M^3$ is a metal transition group III, IV, V or VI of the Periodic Table of the Elements, $R^{10}$ are identical or different and are each a hydrogen atom, $Si(R^{12})_3$ or a $C_1$–$C_{30}$ group, or two or more radicals $R^{10}$ may be joined to one another in such a way that the radicals $R^{10}$ and the atoms of the cyclopentadienyl ring which connect them form a $C_4$–$C_{24}$ ring system which may in turn be substituted, $R^{11}$ are identical or different and are each a hydrogen atom, $Si(R^{12})_3$, or a $C_1$–$C_{30}$ group, or two or more radicals $R^{11}$ may be joined to one another in such a way that the radicals $R^{11}$ and the atoms of the cyclopentadienyl ring which connect them form a $C_4$–$C_{24}$ ring system which may in turn be substituted, $R^{12}$ are identical or different and are each a hydrogen atom or a $C_1$–$C_{40}$ group, l is 5 when v=0, and l is 4 when v=1, m is 5 when v=0, and m is 4 when v=1, $L^1$ may be identical or different and are each a hydrogen atom, a $C_1$–$C_{10}$-hydrocarbon group, a halogen atom, or $OR^{16}$, $SR^{16}$, $OSi(R^{16})_3$, $Si(R^{16})_3$, $P(R^{16})_2$ or $N(R^{16})_2$, where $R^{16}$ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or each $L^1$ is a toluenesulfonyl, trifluoroactyl, trifluoroacetoxyl, trifluoromethanesulfonyl, nonafluorobutanesulfonyl or 2,2,2-trifluoroethanesulfonyl group, o is an integer from 1 to 4, Z is a bridging structural element between the two cyclopentadienyl rings and v is 0 or 1.

13. A process for preparing a polyolefin which comprises polymerizing one or more olefins in the presence of the catalyst system as claimed in claim 1.

14. The catalyst system as claimed in claim 12,
wherein $M^3$ is Ti, Zr or Hf, $R^{10}$ are identical or different and are each a hydrogen atom, $Si(R^{12})_3$, $C_1$–$C_{25}$-alkyl, $C_2$–$C_{25}$-alkenyl, $C_3$–$C_{15}$-alkylalkenyl, $C_6$–$C_{24}$-aryl, $C_5$–$C_{24}$-heteroaryl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alokoxy, or two or more radicals $R^{10}$ may be joined to one another in such a way that the radicals $R^{10}$ and the atoms of the cyclopentadienyl ring which connect them form a $C_4$–$C_{24}$ ring system which may in turn be substituted, $R^{11}$ are identical or different and are each a hydrogen atom, $Si(R^{12})_3$, $C_1$–$C_{25}$-alkyl, $C_2$–$C_{25}$-alkenyl, $C_3$–$C_{15}$-alkylalkenyl, $C_6$–$C_{25}$-aryl, $C_5$–$C_{24}$-heteroaryl, $C_5$–$C_{24}$-alkylheteroaryl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals $R^{11}$ may be joined to one another in such a way that the radicals $R^{11}$ and the atoms of the cyclopentadienyl ring which connect them form a $C_4$–$C_{24}$ ring system which may in turn be substituted, $R^{12}$ are identical or different and are each a hydrogen atom, $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-aklylaryl or $C_8$–$C_{40}$-arylalkeny, or l is 5 when v=0, and l is 4 when v=1, m is 5 when v=0, and m is 4 when v=1, $L^1$ may be identical or different and are each a hydrogen atom, $C_1$–$C_{10}$-alkyl, $C_6$–$C_{10}$-aryl, a halogen atom, or $OR^{16}$, $SR^{16}$, $OSi(R^{16})_3$, $Si(R^{16})_3$, $P(R^{16})_2$ or $N(R^{16})_2$, where $R^{16}$ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or each $L^1$ is a toluenesulfonyl, trifluoroacetyl, trifluoroacetoxyl, trifluoromethanesulfonyl, nonafluorobutanesulfonyl, or 2,2,2-trifluoroethanesulfonyl group, o is 2, Z is a bridging structural element between the two cyclopentadienyl rings and v is 0 or 1.

15. The catalyst as claimed in claim 1, wherein the compound of the formula II is

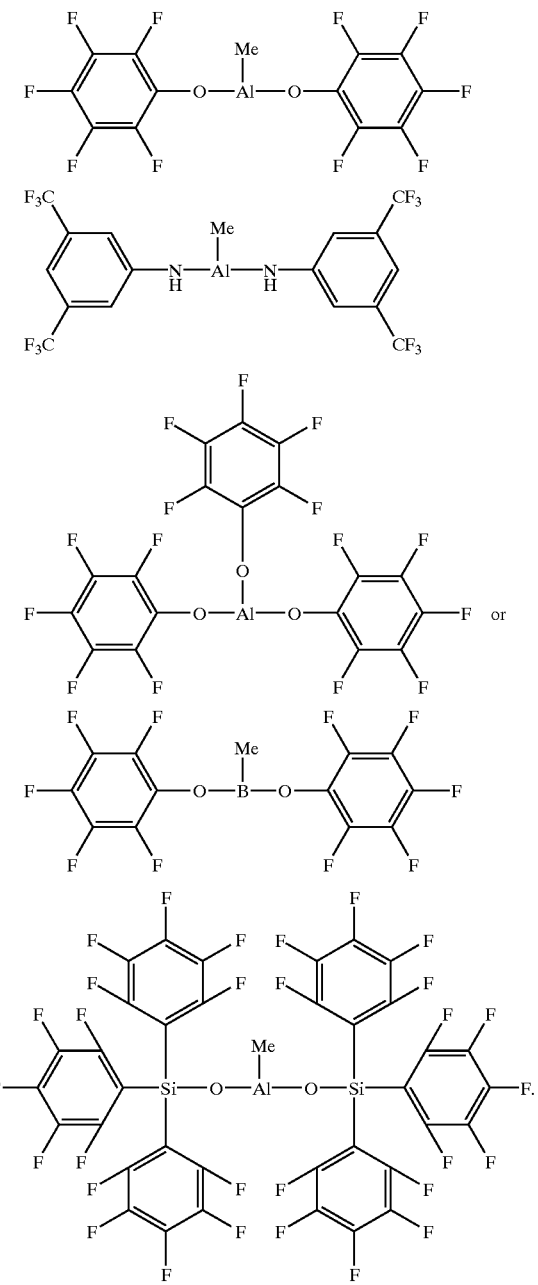

* * * * *

UNITED STATES PATENT AND TRADEMARK OFFICE
CERTIFICATE OF CORRECTION

PATENT NO. : 6,949,614 B1
DATED : September 27, 2005
INVENTOR(S) : Schottek et al.

It is certified that error appears in the above-identified patent and that said Letters Patent is hereby corrected as shown below:

Title page,
Item [56], References Cited, OTHER PUBLICATIONS,
"Kazuaki Ishihara et al, "Reductive Cleave of Chiral Acetals Using New Aluminum Catalysts", Synlett(2):127-127, XP-00093003 (1993)" should read -- Kazuakl Ishihara et al, "Reductive Cleave of Chiral Acetals Using New Aluminum Catalysts", Synlett (2):127-129, XP-00093003 (1993) --.

Column 33,
Line 29, "$C_1$-$C_{20}$-haloalkyl, $C_{5\text{-}C40}$-aryl, $C_8$-$C_{40}$-haloaryl," should read -- $C_1$-$C_{20}$-haloalkyl, $C_6$-$C_{40}$-aryl, $C_6$-$C_{40}$-haloaryl, --.

Signed and Sealed this

Twenty-seventh Day of December, 2005

JON W. DUDAS
*Director of the United States Patent and Trademark Office*